US012374352B2

(12) United States Patent
Sakaguchi et al.

(10) Patent No.: US 12,374,352 B2
(45) Date of Patent: *Jul. 29, 2025

(54) METHODS AND SYSTEMS FOR COMPUTER-GENERATED VISUALIZATION OF SPEECH

(71) Applicant: SomniQ, Inc., Sunnyvale, CA (US)

(72) Inventors: Rikko Sakaguchi, Sunnyvale, CA (US); Hidenori Ishikawa, San Jose, CA (US)

(73) Assignee: SomniQ, Inc., Palo Alto, CA (US)

( * ) Notice: Subject to any disclaimer, the term of this patent is extended or adjusted under 35 U.S.C. 154(b) by 22 days.

This patent is subject to a terminal disclaimer.

(21) Appl. No.: 18/451,736

(22) Filed: Aug. 17, 2023

(65) Prior Publication Data

US 2024/0087591 A1 Mar. 14, 2024

Related U.S. Application Data

(63) Continuation of application No. 17/404,873, filed on Aug. 17, 2021, now Pat. No. 11,735,204.

(Continued)

(51) Int. Cl.
*G10L 21/12* (2013.01)
*G10L 21/10* (2013.01)

(Continued)

(52) U.S. Cl.
CPC .............. *G10L 21/12* (2013.01); *G10L 21/10* (2013.01); *G10L 21/14* (2013.01); *G10L 25/93* (2013.01)

(58) Field of Classification Search
CPC .......... G10L 21/10; G10L 21/12; G10L 21/14
See application file for complete search history.

(56) References Cited

U.S. PATENT DOCUMENTS 6,006,187 A 12/1999 Tanenblatt
6,126,447 A 10/2000 Engelbrite (Continued)

FOREIGN PATENT DOCUMENTS

JP S6193484 A 5/1986
JP H10133679 A 5/1998

(Continued)

OTHER PUBLICATIONS

PCT Application PCT/US21/46366 titled "Methods and Systems for Computer-Generated Visualization of Speech" filed Aug. 17, 2021, pp. all.

(Continued)

*Primary Examiner* — Shaun Roberts
(74) *Attorney, Agent, or Firm* — Dorsey & Whitney LLP

(57) ABSTRACT

Methods, systems and apparatuses for computer-generated visualization of speech are described herein. An example method of computer-generated visualization of speech including at least one segment includes: generating a graphical representation of an object corresponding to a segment of the speech; and displaying the graphical representation of the object on a screen of a computing device. Generating the graphical representation includes: representing a duration of the respective segment by a length of the object and representing intensity of the respective segment by a width of the object; and placing, in the graphical representation, a space between adjacent objects.

22 Claims, 15 Drawing Sheets

Related U.S. Application Data

(60) Provisional application No. 63/068,734, filed on Aug. 21, 2020.

(51) Int. Cl.
*G10L 21/14* (2013.01)
*G10L 25/93* (2013.01)

(56) References Cited

U.S. PATENT DOCUMENTS

| | | | | |
|---|---|---|---|---|
| 6,336,089 | B1 | 1/2002 | Everding | |
| 6,397,185 | B1 * | 5/2002 | Komissarchik | G10L 21/06 434/167 |
| 7,153,139 | B2 * | 12/2006 | Wen | G09B 5/06 434/362 |
| 8,543,400 | B2 * | 9/2013 | Lee | G09B 19/04 704/254 |
| 8,841,535 | B2 | 9/2014 | Collins | |
| 9,218,055 | B2 | 12/2015 | Sakaguchi et al. | |
| 9,946,351 | B2 | 4/2018 | Sakaguchi et al. | |
| 10,222,875 | B2 | 3/2019 | Sakaguchi et al. | |
| 11,682,318 | B2 * | 6/2023 | Jochim | G09B 19/06 434/157 |
| 11,735,204 | B2 | 8/2023 | Sakaguchi et al. | |
| 2003/0225580 | A1 | 12/2003 | Lin | |
| 2005/0243996 | A1 | 11/2005 | Fitchmun | |
| 2006/0025214 | A1 | 2/2006 | Smith | |
| 2013/0162649 | A1 | 6/2013 | Oshima et al. | |
| 2015/0134338 | A1 | 5/2015 | Jung | |
| 2017/0092264 | A1 | 3/2017 | Hakkani-Tur et al. | |
| 2018/0277017 | A1 | 9/2018 | Cheung | |
| 2018/0342258 | A1 | 11/2018 | Huffman et al. | |
| 2020/0126584 | A1 | 4/2020 | Huang et al. | |
| 2022/0059116 | A1 | 2/2022 | Sakaguchi et al. | |

FOREIGN PATENT DOCUMENTS

| | | |
|---|---|---|
| JP | 2003186379 | 7/2003 |
| JP | 2013134475 | 7/2013 |
| WO | 2022040229 | 2/2022 |

OTHER PUBLICATIONS

Oktem, Alp , et al., "Prosograph: a tool for prosody visualisation of large speech corpora.", Proceedings of the 18th Annual Conference of the International Speech Communication Association (Interspeech 2017); 2017 (Year: 2017), pp. all.

International Search Report and Written Opinion for PCT/US2021/046366, mailed Dec. 7, 2021, pp. all.

"Office Action and Translation for JP Appl. No. 2023-512331, dated Apr. 16, 2024".

* cited by examiner

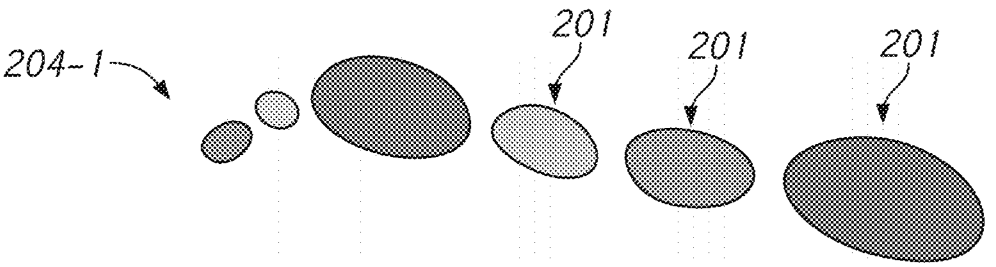

Segment (Object of Size that Communicates Duration and Intensity of Segment) + Pitch + Pause + Phoneme

FIG. 2D

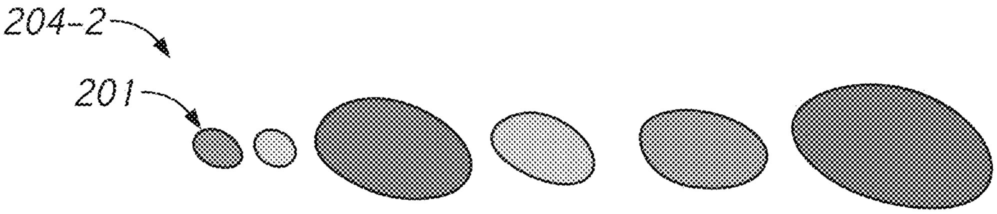

Segment (Object of Size that Communicates Duration and Intensity of Segment) + Pause + Phoneme

FIG. 2E

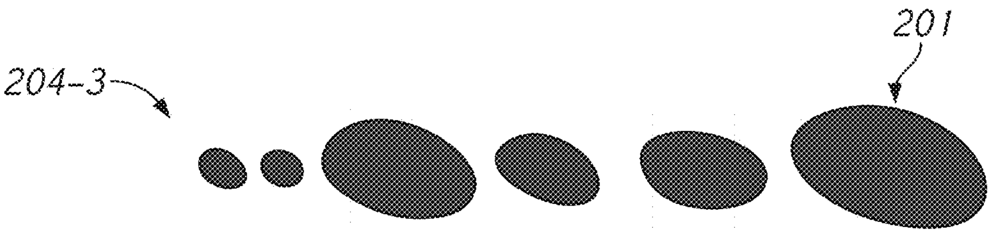

Segment (Object of Size that Communicates Duration and Intensity of Segment) + Pause

FIG. 2F

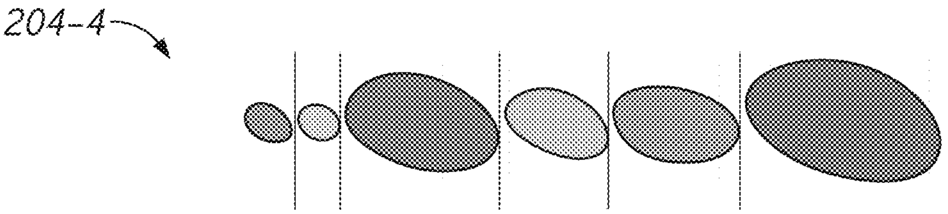

Segment (Object of Size that Communicates Duration and Intensity of Segment) + Phoneme

FIG. 2G

METHODS AND SYSTEMS FOR COMPUTER-GENERATED VISUALIZATION OF SPEECH

CROSS REFERENCE TO RELATED APPLICATION(S)

This application is a continuation of U.S. patent application Ser. No. 17/404,873, filed on Aug. 17, 2021, and issued as U.S. Pat. No. 11,735,204 on Aug. 22, 2023, which claims the benefit under 35 U.S.C. § 119 of the earlier filing date of U.S. Provisional Application No. 63/068,734, filed Aug. 21, 2020, the entire contents of which are hereby incorporated by reference herein in their entirety for any purpose.

TECHNICAL FIELD

This invention relates generally to methods, systems and apparatuses for spoken language learning, and more particularly, to methods and systems of computer-generated visualization of speech for language learners.

BACKGROUND

Humans convey information by vocalized expression, typically speech. Information conveyed while a human is producing speech can be categorized into linguistic information, paralinguistic information and nonlinguistic information. Linguistic information is generally represented in a written form. Paralinguistic information may be accompanied with linguistic information during the speech. Nonlinguistic information may be independent from linguistic information conveyed during the speech.

For example, in case of English, linguistic information is associated with phonetic feature that can be represented in strings of Roman alphabets. Phonemes are perceptually distinct units of sound in a specified language, such as consonants and vowels in English. In representing each phoneme in English, one or two Roman alphabets may be used. A string of alphabet constitutes a word that may include one or more syllables, where each syllable typically includes one vowel, and may also include one or more consonants surrounding the vowel. Vowels may be observed by physical parameters, such as lower formant frequencies (e.g., $F_1$ and $F_2$) largely dominant to listener's perception of vowels. Formant frequencies are obtained as local maximums on a spectrogram. The formant frequencies are known to represent acoustic resonances of a human vocal tract. Consonants may be observed as a non-periodic signal, or a periodic signal in a high frequency region of a spectrogram. Paralinguistic information in English are usually represented by prosodic features. For example, prosodic features include stress, rhythm and pitch. Stress may be observed as intensity. Rhythm is a temporal parameter that includes duration of each phoneme or syllable and pause between phonemes or syllables. Pitch is a perceived height of voice conveying speech. Frequently pitch may be observed as fundamental frequencies (e.g., $F_0$) on a spectrogram.

Conventional visual representations of speech have heavily relied on spectrograms showing intensity as a darkness on a plane defined by a time axis and frequency axis, and contours of extracted acoustic parameters (e.g., $F_0$, $F_1$ and $F_2$), with phonetic notations such as International Phonetic Alphabets (IPA). Each alphabet of IPA corresponds to each phoneme, and there is an advantage of accurately representing pronunciation of phonemes with IPA, regardless of text representation using Roman alphabets in English having a variation such as "right" and "write" which may be represented the same with IPA.

However, such conventional visual representations of speech, namely spectrogram representations and IPA notations are neither intuitive nor user friendly to the users. More user friendly visual representations of speech are desired, so that users can intuitively learn differences between reference speech recordings (e.g., provided by native speakers and trained second language teachers) and their own speech recordings through the visual representations of speech.

SUMMARY

Systems and methods for graphical representation including at least one segment are described. According to some embodiments, a method of computer-generated visualization of speech including at least one segment includes generating a graphical representation of an object corresponding to a segment of the speech, wherein the generating of the graphical representation includes at least representing a duration of the segment by a length of the object, representing intensity of the segment by a width of the object, and representing a pitch contour of the segment by an angle of inclination of the object with respect to a reference frame, whereafter, the graphical representation of the object is displayed on a screen of a computing device. In some embodiments in which the pitch contour is associated with movement of fundamental frequencies, the generating of the graphical representation further includes representing an offset of the fundamental frequencies of the segment by a vertical position of the object with respect to the reference frame. In some embodiments, the segment is a first segment and the method includes displaying a first object corresponding to the first segment, and displaying a second object corresponding to and a second segment of the speech following the first segment such that the first object and the second object are separated by a space corresponding to an unvoiced period between the first segment and the segment. In some embodiments, the method includes generating a graphical representation comprising a plurality of objects, each corresponding to a respective segment of the speech, wherein generating the graphical representation comprises, for each of the plurality of objects: representing a duration of the respective segment by a length of the object and representing intensity of the respective segment by a width of the object, and placing, in the graphical representation, a space between adjacent objects. In some embodiments, each of the plurality of objects is defined by a boundary and wherein the space between the boundaries of two adjacent objects in the graphical representation is based on a duration of an unvoiced period. In some embodiments, the method further includes displaying the object in a color selected based on a location and/or a manner of articulation of a sound that corresponds to the segment. In some embodiments, the segment includes at least one phoneme. In some embodiments, the segment includes at least one vowel in the at least one phoneme. In some embodiments, the method includes displaying the object in a color selected based on a first phoneme in the segment. In some embodiments, the method includes parsing the speech into the segment including the at least one phoneme, and displaying the at least one phoneme as at least one symbol accompanied with the object. In some embodiments, the method includes generating and displaying on the screen a first visualization of a first speech spoken by a first speaker, wherein the first visualization includes a first set of objects corresponding to the first speech on the screen, generating a second visualization of a second speech spoken by a second speaker, wherein the second visualization includes a second set of objects corresponding to the second speech, and displaying the second visualization on the screen such that a first end of the first set of objects and a first end of the second set of objects are substantially vertically aligned on the screen. In some embodiments of the method, wherein the computing device includes a microphone input, the method includes recording the second speech through the microphone input following the displaying of the first visualization, and generating and displaying the second visualization responsive to the recorded second speech. In some embodiments, the object has a shape selected from a rectangle, an ellipse, and an oval. In some embodiments, the angle of inclination of the object changes along the length of the object.

Disclosed herein are embodiments of a non-transitory computer-readable medium having instructions which when executed by one or more processors of a computing device cause the computing device to perform a method according to any of the examples herein. The non-transitory computer-readable medium according to any of the embodiments herein may be part of a computing system, which may optionally include a display. In some embodiments, the non-transitory computer-readable medium may be provided by a memory of the computing device that displays the computer-generated visualization of the speech In some embodiments, a non-transitory computer-readable medium having instructions stored thereon that are executable by a computing device to generate a visualization of speech, wherein the visualization includes an object corresponding to a segment of the speech. In some embodiments, the generating of the visualization of speech includes representing a duration of the segment by a length of the object, representing intensity of the segment by a width of the object, and representing a pitch contour of the segment by an angle of inclination of the object with respect to a reference frame. The instructions further cause the computing device to display the visualization on a screen coupled to the computing device. In some embodiments the object is a two-dimensional object having a regular geometric shape. In some embodiments the object has a shape selected from an oval, an ellipse, and a rectangle. In some embodiments, wherein the pitch contour is associated with movement of fundamental frequencies, the generating of the visualization further comprises representing an offset of the fundamental frequencies of the segment by a vertical position of the object with respect to the reference frame. In some embodiments, wherein the segment is a first segment of the speech, the instructions further cause the computing device to display a first object corresponding to the first segment and display a second object corresponding to a second segment of the speech following the first segment, wherein the first object and the second object are separated by a space corresponding to an unvoiced period between the first segment and the segment. In some embodiments the segment includes at least one phoneme. In some embodiments, the segment includes at least one vowel in the at least one phoneme. In some embodiments, the instructions further cause the computing device to display the object in a color selected based on a first phoneme in the segment. In some embodiments the color is selected based on a location and/or a manner of articulation a sound that corresponds to the segment. In some embodiments, the instructions further cause the computing device to parse the speech into the at least one segment including the at least one phoneme, and represent the at least one phoneme as a corresponding number of symbols in the visualization together with the object. In some embodiments, the instructions further cause the computing device to generate and displaying on the screen a first visualization of a first speech spoken by a first speaker, wherein the first visualization includes a first set of objects corresponding to the first speech on the screen, generate a second visualization of a second speech spoken by a second speaker, wherein the second visualization includes a second set of objects corresponding to the second speech, and display the second visualization on the screen such that a first end of the first set of objects and a first end of the second set of objects are substantially vertically aligned on the screen. In some embodiments, wherein the computing device is coupled to a microphone input, the instructions further cause the computing device to record the second speech through the microphone input following the displaying of the first visualization, and to generate and display the second visualization responsive to the recorded second speech. In some embodiments, wherein the computing device is coupled to an audio output, the instructions further cause the computing device to provide audio playback of the first speech through the audio output, and to provide a user control configured to enable the user to replay the audio playback of the first speech following the displaying of the second visualization.

A system according to some embodiments herein includes a processor, a display, and a memory comprising instructions that, when executed by the processor, cause the processor to perform any of the operations associated with generating visualization of speed described herein. In some embodiments, these operations include displaying a first object corresponding to the first segment, displaying a second object corresponding to a second segment of the speech following the first segment, and placing a space between the first object and a second object, the space corresponds to an unvoiced period between the first segment and the segment. In some embodiments, the operations further include displaying the object in a color selected based on a location and/or a manner of articulation of a sound that corresponds to the segment. In some embodiments, the operations further include generating and displaying on the screen a first visualization of a first speech spoken by a first speaker, wherein the first visualization includes a first set of objects corresponding to the first speech on the screen, generating a second visualization of a second speech spoken by a second speaker, wherein the second visualization includes a second set of objects corresponding to the second speech, and displaying the second visualization on the screen such that a first end of the first set of objects and a first end of the second set of objects are substantially vertically aligned on the screen. The inventive subject matter herein is not limited to the embodiments outlined in this summary section.

BRIEF DESCRIPTION OF THE DRAWINGS

FIGS. 2D-2G are schematic diagrams of generated visual representations of speeches in accordance with an embodiment of the present disclosure.

DETAILED DESCRIPTION

Figure 1:
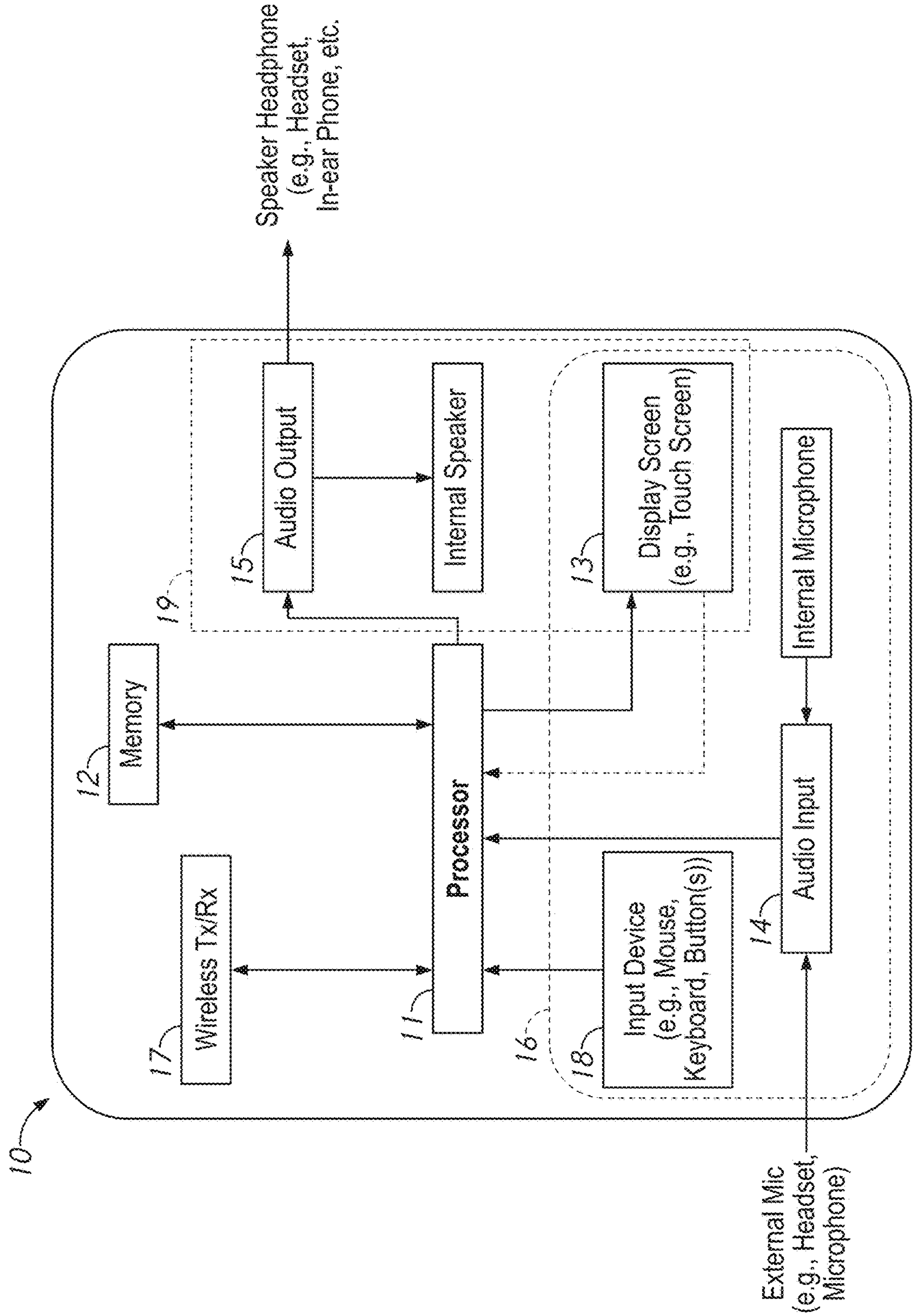
FIG. 1 is a simplified block diagram of an apparatus in accordance with an embodiment of the present disclosure.

Various embodiments of the present disclosure will be explained below in detail with reference to the accompanying drawings. The following detailed description refers to the accompanying drawings that show, by way of illustration, specific aspects and embodiments in which the present invention may be practiced. These embodiments are described in sufficient detail to enable those skilled in the art to practice the present invention. Other embodiments may be utilized, and algorithm, structure and logical changes may be made without departing from the scope of the present invention. The various embodiments disclosed herein are not necessarily mutually exclusive, as some disclosed embodiments can be combined with one or more other disclosed embodiments to form new embodiments.

In accordance with the present disclosure an apparatus, system and methods for providing computer-generated visualization of speech are disclosed. In some embodiments, the speech, which may be detected (e.g., from recorded speech) and processed via currently-known or later developed speech recognition techniques may include and thus be segmented into multiple segments. In some embodiments, one or more of the individual segments may include at least one phoneme. In some embodiments, a segment may include a syllable. In some embodiments, the speech may be segmented into multiple segments some of which correspond to phonemes and others correspond to syllables. In some embodiments, the segmentation used (e.g., phoneme-based, syllable-based, or other) may depend upon a confidence or accuracy metric. The speech may also include unvoiced periods between segments of the speech. In accordance with some examples, a graphical representation is generated that visualizes the speech in a way that may be more intuitive or user-friendly to a non-expert user, and the graphical representation is displayed on a screen of a computing device. The graphical representation used to visualize the speech may include one or more objects, each of which corresponds to a segment of the speech. In generating the graphical representation, the duration of each segment of the speech is represented by the length of the object and the intensity of that segment of the speech is represented by the width of the object. The individual objects that represent individual segments of the speech may be spaced apart from one another in the graphical representation, the spacing corresponding to an unvoiced period between the corresponding segments. In embodiments herein, each object has a boundary and the size (e.g., length) of the space between boundaries to two adjacent objects corresponds to the duration of the unvoiced period between the corresponding segments. In some embodiments, the object may have a shape selected from a rectangle, an ellipse, an oval or other regular geometric shape. A regular geometric shape may be a shape that has symmetry about one or more axes. In some embodiments, the object need not be represented by a regular geometric shape as long as it can be clearly defined (e.g., bound/delineated by a boundary) and have a length and width to represent the duration and intensity, respectively, of the corresponding segment.

In some embodiments, the graphical representation used to visualize the speech may further involve representing a pitch contour of the segment by a tilt or angle of inclination of the object, such as with respect to a reference frame that may but more often may not be displayed. In the context herein, the pitch contour may represent movement of one or more physical parameters associated with the perceived height or pitch of a voice, also referred to as pitch parameters. One example of a pitch contour may be a contour representing the movement of a fundamental frequency, but the examples herein are not limited to only this pitch parameter. In some embodiments, the tilt or incline angle of an object may vary along its length thereby capturing or reflecting an inflection in the pitch contour associated with a given segment of the speech. In further embodiments, an offset of a pitch parameter (e.g., offset of a fundamental frequency) may be represented in the visualization by a height of the object relative to the reference frame. In some embodiments additional information about the speech may be communicated, via the visualization, such as by selecting a color of the object based on a location and/or a manner of articulation of one or more sounds that correspond to the segment. For example, different colors may be assigned to different phonemes. In some embodiments, a color of the object may be selected based on the first phoneme in a segment. In some embodiments, commonalities in the location and/or manner of articulation of sounds of different phonemes (e.g., use of the same articulation organ to articulate the sounds of two different phonemes) may be reflected by commonalities in color (e.g., different shades of a same color and/or colors that can be otherwise grouped in a color group). Various other combinations and variations may be used to provide an intuitive and user-friendly visualization of the speech. The methods for providing computer-generated visualizations of speech described herein may be embodied on computer-readable media, e.g., in the form of instructions, which when executed by a computing device cause the computing device to generate and/or display a graphical representation of the speech in accordance with any of the examples herein.

FIG. 1 is a simplified block diagram of an apparatus 10 in accordance with an embodiment of the present disclosure. An apparatus 10 may be implemented, in part, by a smartphone, a portable computing device, a laptop computer, a game console or a desktop computer. The apparatus 10 may be implemented by any other suitable computing device. In some embodiments, the apparatus 10 includes a processor 11, a memory 12 coupled to the processor 11, and a display screen 13 also coupled to the processor 11 and which may be a touch screen, in some examples. The apparatus may further include one or more input devices 16, an external communication interface (e.g., a wireless transceiver/receiver (Tx/Rx) 17) and one or more output devices 19 (e.g., the display screen 13, and an audio output 15). While the application refers to "a" or "an" when describing components of systems (e.g., components of the apparatus 10, such as processor 11 and memory 12), it will be understood that any of these components (e.g., the processor and/or memory) may include one or a plurality of individual such components which are operatively arranged (e.g., in parallel or other suitable arrangement) to provide the functionality of the component(s) described herein. For example, in the case of memory, multiple memory devices may implement the memory 12, the memory devices being arranged, for example, in parallel, and may store the same or different types of data with same or different storage time. In some examples, the display screen 13 may be coupled to a video processor (e.g., a graphics processing unit (GPU)) which controls display operations of the display screen 13 (e.g., to control the display of graphics and video data on the screen 13). In some embodiments, the display screen 13 may be a touch screen and provide user interaction data (e.g., received via user inputs) to the processor 11. For example, the touch-sensitive display screen 13 may detect touch operations of a user, such as a tap, swipe, etc., of a certain area on a surface of the touch screen. The touch screen may provide information regarding the detected touch operations to the processor 11. The processor 11 may cause the apparatus 10 to process speech and generate visual representations of the speech, in some instances responsive to the touch operations. As such, a touch-sensitive display screen 13 of the apparatus 10 may function as both an input device 16 and an output device 19. In some embodiments, the apparatus 10 may include one or more additional input devices 16 (e.g., input device 18 which may include one or more buttons, keys, pointer devices, etc., and audio input 14). In some embodiments, the processing of the speech is performed, in part, by the processor 11. In other embodiments, the speech may be processed by an external processor in communication with processor 11 via a communication interface (e.g., wireless transceiver/receiver (Tx/Rx) 17). The wireless transceiver/receiver (Tx/Rx) 17 may facilitate communication of the apparatus 10 with an internet using a mobile network (e.g., 3G, 4G, 5G, LTE, Wi-Fi, etc.) or with another device using peer-to-peer connection.

As illustrated, the apparatus 10 may include an audio input 14 and an audio output 15. While the application refers to "an" audio input and "an" audio output, it will be understood that any of these components (e.g., the microphone input, audio output) can include one or more. For example, the apparatus 10 may include one or more audio inputs for internal and/or external microphones, one or more audio outputs for internal and/or external speakers and/or phone jacks. In some examples, the audio input 14 and the audio output 15 may be coupled to one or more audio signal processors which control audio signal processing of an audio input signal from the audio input 14 or an audio output signal to the audio output 15. Thus, the audio input 14 and the audio output 15 may be operatively coupled to the processor 11 via the audio DSPs. The processor 11 may cause the apparatus 10 to record audio data converted from the audio input signal or playback audio data by providing the audio output signal.

Figure 2A:
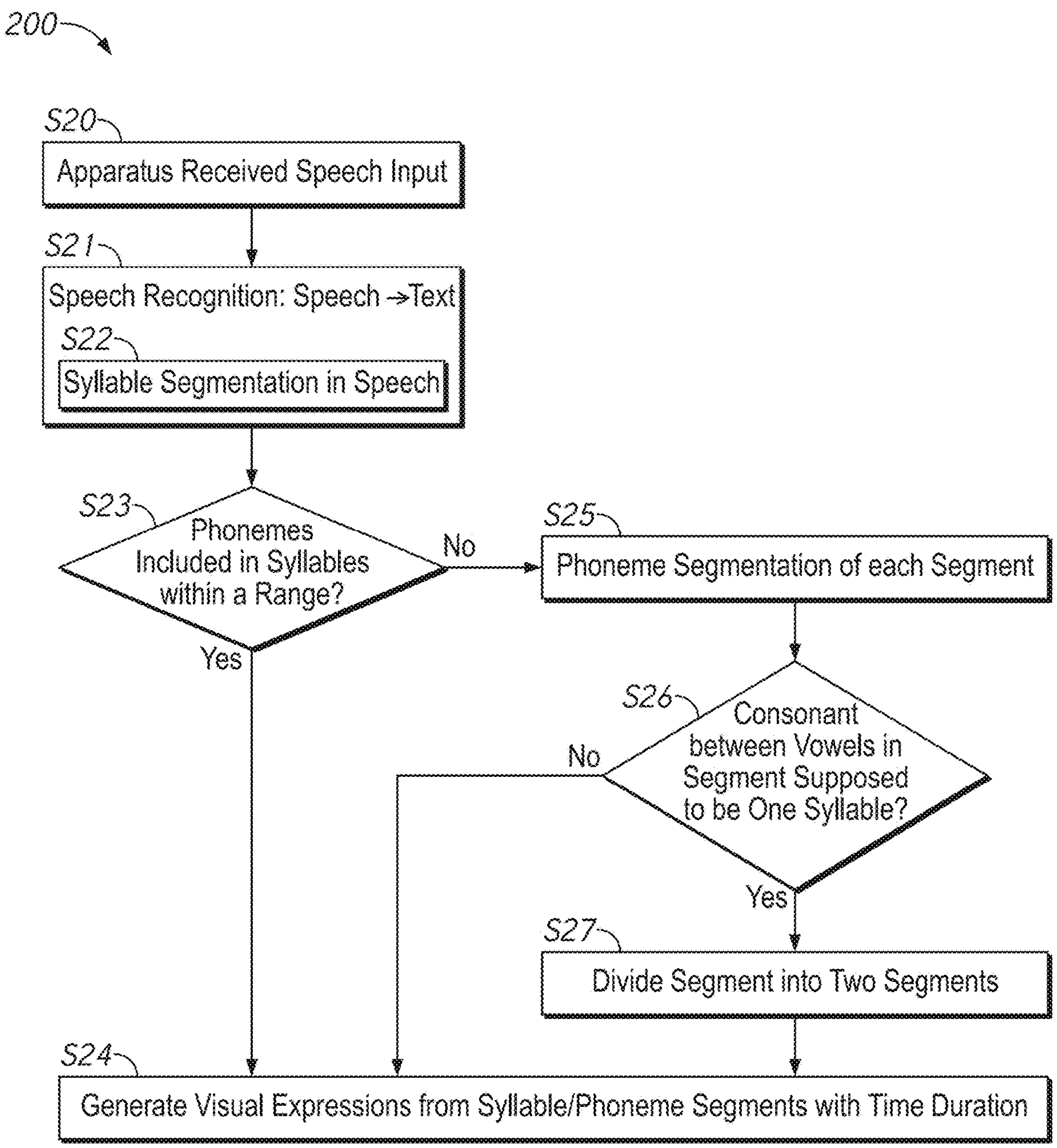
FIG. 2A is a flow diagram of a segmentation process of speech, in accordance with an embodiment of the present disclosure.

FIG. 2A is a flow diagram of a process 200 for visualizing speech, which may be performed by the apparatus 10 (e.g., at least in part by processor 11), in accordance with some embodiments of the present disclosure. The apparatus 10 may receive a speech input at step S20. The speech input may be an utterance or vocalization of a word, phrase or other by a user. The speech input may be a pre-recorded, stored vocalization (e.g., reference speech). The speech input may be received by the apparatus 10 as an acoustic signal (i.e. a waveform signal (or simply waveform) representing the utterance or vocalization). A speech engine, which may implement any known or later developed speech recognition techniques, may process the speech input (i.e. the acoustic signal) to segment the speech and obtain a text representation, as shown in block S21. Additionally or alternatively, the speech engine may output a spectrogram of the speech input. In other examples, the spectrogram may be obtained independently of the speech recognition, again using currently known or later developed techniques. A spectrogram representation of the speech input may be generated or obtained in some embodiments, but is not essential for the operation of the visualization engine herein. In some embodiments, alternatively or additionally, a reference text may be provided with the vocalization and independent of any speech recognition performed on the vocalization at block S21.

The speech engine may be implemented, fully or in part, by the processor 11 of the apparatus 10. In some embodiments, at least a portion of the speech engine may be implemented by a processor remote from the apparatus 10 and communicatively coupled thereto, for example a processor of a server in e.g., wireless communication with apparatus 10. The speech engine may be implemented as a program (e.g., instructions stored on computer-readable medium) which may be stored and executed locally on the apparatus 10, which may be stored remotely and executed locally by the apparatus 10, or at least a portion of which may be stored and be executed on a remote computing device (e.g., a server). The apparatus 10 may further implement a speech visualization engine (SVE), which may similarly be implemented as a program that may be stored locally or remotely (e.g., on a server, on the cloud), and which may be executed, at least in part, locally by the apparatus 10. For example, the SVE may be executed locally by processor 11 and when executed may perform a visualization process in accordance with any of the examples herein. In some examples, the segmentation of the speech (S22), which may be part of the speech recognition process, may be performed locally (e.g., by processor 11) or it may be performed remotely (e.g., by the processor of a remote/cloud server). Visualization processes, for generating visual expression of the segmented speech input, may be performed locally by processor 11. In some examples, components of the SVE may be stored as program code on an external memory storage device (e.g., a USB key memory, a memory device of a server residing in the cloud) communicatively coupled to the apparatus 10. When any portions of the process 200 (e.g., the segmentation portion) is executed remotely (e.g., on the cloud) information for generating the visual expression (e.g., segments' characteristics, pitch information, etc.) may be communicated to the apparatus via its external communication interface (e.g., the wireless transmitter/receiver 17 or via a wired connection).

In order to visually express the vocalization (e.g., received by the processor 11 as speech input), the speech input is segmented. Segmentation, which involves parsing of the speech input into segments, may be performed by the speech engine, which may be executed by processor 11 of the apparatus 10 or another processor. For example, the speech engine may parse the speech input, segmenting it into syllable units (see block S22). This may be referred to as syllable level segmentation. At this stage, the segmentation into syllable units may be performed by dividing the speech input in a manner such that each segment corresponds to a supposed syllable in the text representation. However, due to variability in pronunciation of different users, particularly non-native speakers with whom insertion of vowels between consonants may occur, a segmented unit, which when segmented at the syllable level is expected to contain a single syllable may in fact contain multiple syllables because that segment of the speech is pronounced differently by some users (e.g., by inserting vowels where a vowel should not be present). Thus, the process 200 may include an accuracy check, starting at step S23. Once syllable level segmentation is completed (S22), the process 200 may determine the accuracy of the syllable level segmentation, such as by determining if the phonemes included in the segmented syllable unit substantially match the expected phonemes of that syllable. For example, the process 200 may compare the syllable unit(s) or segment(s) including associated phonemes with a reference sequence of phonemes. The reference sequence of phonemes may be obtained based on the text representation, either by using International Phonetic Alphabets (IPA) symbols listed in a commonly used dictionary, or by manually annotating recording of the reference speech by native speaker or by executing speech recognition on the recording of the reference speech by the native speaker. In some embodiments, a modified version of one or more of the IPA symbols may be used to more precisely represent pronunciation of the reference speech (e.g., to represent contractions of sound) and/or provide additional guidance to the user beyond that provided by IPA symbols. For example, a mark or other mechanism for further annotating the IPA symbols may be used. In some embodiments, the modified version of IPA symbols may involve representing the symbol in bold letters, smaller vs. larger letters, etc. If phonemes in the syllable units or segments are determined to be highly corresponding to the reference sequence of phonemes (Y: S23), the process 200 determines that the syllable segmentation is of sufficient accuracy and proceeds to steps associated with generating the graphical representation (also referred to as visual expression) of the syllable segments (at S24). If the accuracy of the syllable segmentation is low, such as by determining that the syllables segments are not highly corresponding to the reference sequence of phonemes (N: S23), segmentation may continue at a phoneme level (S25). Here, the supposed syllable unit(s) or segmented(s) from the syllable level segmentation at step S22 (e.g., units with low correspondence to the reference sequence) are reviewed at the phoneme level and if a syllable segment, which is supposed to correspond to a single syllable, is determined to in fact include two or more syllables (Y: S26), such as by identifying multiple vowels in a segment, then the segment may be divided into two segments (S27) so that each segment now contains one vowel. After ensuring that each segment includes one syllable, the apparatus (e.g., processor 11) may generate a visual expression of the speech input based on the syllable/phoneme segments (S24). When displaying the visual expression, the full visualization (e.g., all generated objects for the speech input) may be displayed at once or the object display may occur in the form of animation (e.g., with successive objects displaying sequentially after earlier objects have been displayed).

Figure 2B:
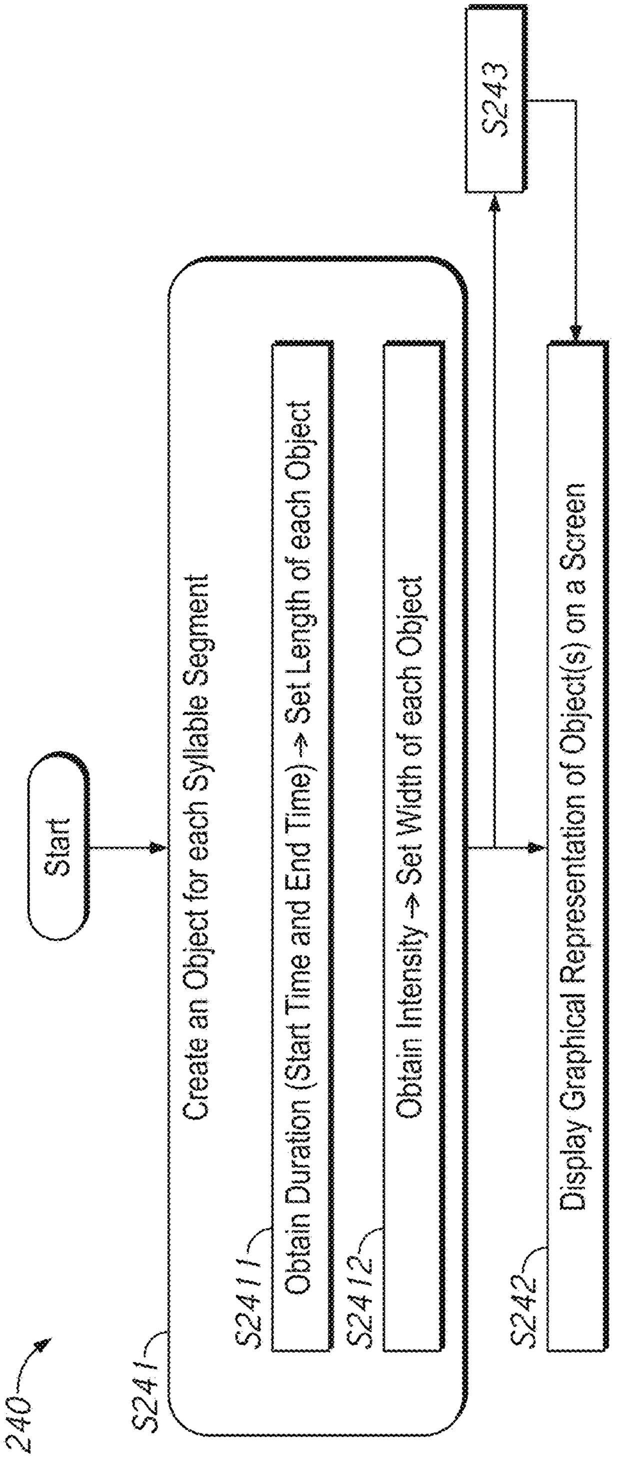
FIG. 2B is a flow diagram of generating a visual representation of a segment, in accordance with an embodiment of the present disclosure.

FIG. 2B is a flow diagram of a process 240 for generating a visual expression or representation of segments of speech in accordance with some embodiments of the present disclosure. The process 240 may be used implement, at least in part, step S24 of the process in FIG. 2A. The process 240 may be performed on segments extracted via the process in FIG. 2A or on segments extracted by a different process, such as by conventional techniques. The process 240 may be performed by an SVE according to the present disclosure, for example executed locally by the processor 11 of the apparatus 10. Using the process in FIG. 2B, a visual representation of speech may be generated such that a graphical object is created for each syllable segment in the speech input (see block S241). The step S241 may include selecting an object from any suitably shaped object, such as a regularly shaped object (e.g., oval, rectangle, ellipse, or other) for a segment, and setting parameters such as the length, the width, and optionally an angle of inclination, vertical position, color, etc. of each of the graphical objects. This may be done for each segment of the speech input such that each segment (e.g., each segmented vocalized unit such as a syllable or phoneme) is visually represented by an object. Preferably, so as to be more pleasing to the eye, same-shape objects (e.g., all ovals or all rectangles) may be used for all segments in a given visualized speech input. However, it is envisioned, that object of different shapes may be used for any given visualization (e.g., when visualizing a given phrase) or series of visualizations. In some embodiments, the type of object used for the visualization (e.g., a rectangle, oval, etc.) may be configurable by a user. In other examples, it may be pre-programmed into the SVE.

Figure 2C:
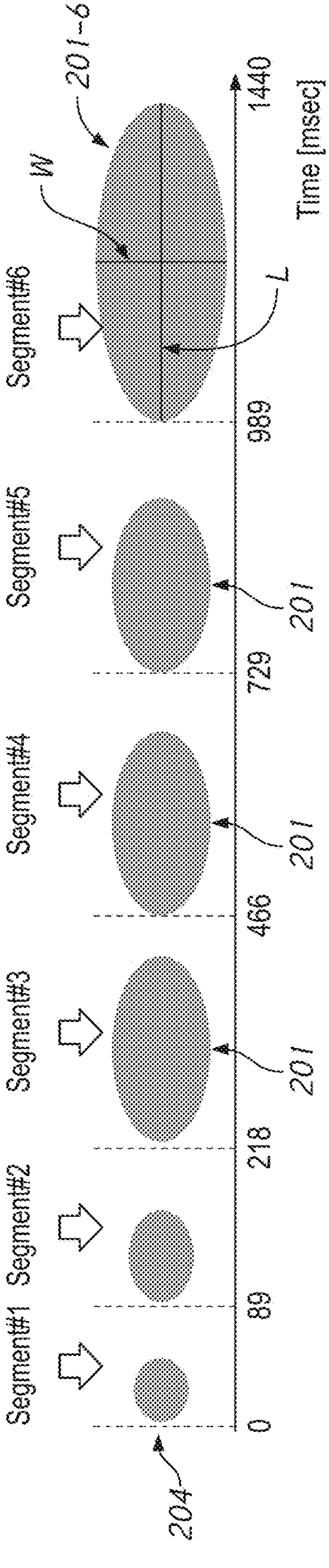
FIG. 2C is a timing diagram of a generated visual representation of speech, in accordance with an embodiment of the present disclosure.

Referring again to FIG. 2B and also to FIG. 2C, which shows an example visualization 204 the length (L) of any given object 201 may be set to represent or correspond to the duration of a given segment, and thus the duration of each of the segments of the speech input is obtained (at step S2411). For example, a start time and an end time, and thus a duration of any of syllable/phoneme segments of the speech input, may be obtained from the waveform and/or the spectrogram that corresponds to the speech input. The intensity of each of the syllable/phoneme segments may also be obtained (e.g., from the waveform and/or spectrogram, in some cases during the speech recognition process) and the width (W) of each graphical object may be set according to the intensity of the respective segment (at S2412). The Steps S2411 and S2412 may be executed in any order. With this basic prosodic information captured in each object, visualization 204 of a speech input may be generated and displayed, by displaying the graphical representations of the objects on a display screen (S242). In some embodiments, the process may include additional, optional step(s) (S243) for further tailoring the visual representation of the speech input. As will be further described, other aspects of the graphical objects and their relative arrangement may optionally be tailored to convey additional prosodic information about the speech input. For examples, the objects may be spaced apart based upon a duration of unvoiced periods (e.g., periods which have been determined not to correspond to a detectable syllable or phoneme) between the segments. In some examples, a tilt or incline angle of the object may be set to reflect a pitch contour of the speech input. In yet further examples, the individual graphical object may not be vertically aligned, but may be offset (e.g., with respect to one another and/or a reference frame) to convey additional prosodic information such as a pitch height or offset of the fundamental frequency of a given segment. In yet further examples, a color of the object may be selected based on the location and/or manner of articulation of a sound associated with the segment.

Referring back to FIGS. 2B and 2C, a graphical representation (or visualization) 204 of a speech input is displayed on a screen (e.g., the display screen 13 of apparatus 10) (at S242), which includes the plurality of graphical objects representing each of the segments of the speech input. In some embodiments, the visualization 204 is displayed after all of the segments of a given speech input have been analyzed and corresponding objects 201 created. In other embodiments, the graphical representation (e.g., individual objects 201) may be displayed sequentially as the speech input is being processed to build up a visualization 204 of a given vocalization (e.g., a spoken phrase). That is, one or more graphical objects 201 may be displayed as soon as the associated segment(s) have been processed and the parameters of the object (e.g., length, width, color, tilt, vertical position, spacing, etc.) have been determined. FIG. 2C shows an example of a visual representation of speech 204 (also referred to a visual expression or visualization 204) in accordance with the present disclosure. In the example in FIG. 2C, each graphical object 201 corresponding to a respective, identified segment in the speech input is a two-dimensional object 201 having a regular geometric shape, in this case an ellipse. The graphical objects 201 are each defined by a boundary and are shown, in this example, relative to a reference frame defined by a time axis and a frequency axis on the screen. It will be understood that the reference frame axes are shown in FIG. 2C to facilitate an understanding of the present example but the reference frame may not be displayed when the visualization 204 is provided to a user (e.g., on the display screen 13 of the apparatus 10). The graphical object may have any suitable shape. For example, for an intuitive and pleasing visualization, the shape of the graphical objects may be selected from a rectangle, an ellipse, an oval or any other regular geometric shape. Virtually any geometrical shape with at least one line of symmetry (e.g., a teardrop, a trapezoid, or other) may be used. In some embodiments, the longitudinal direction (and thus the length) of a given object 201 may lie substantially in a straight line, as in the present example. However, in other examples, the longitudinal direction may follow a curve and thus an incline angle or tilt of the object may vary along the length of the object. This may be used to represent variations in pitch within a single segment. Consecutive objects of the visualization 204 are associated with consecutive segments of the speech input such that all segments of the vocalization are visually represented on the screen. In some embodiments, as in the present example, the objects may be spaced apart by a distance that corresponds to an unvoiced period of the speech input. For example, in FIG. 2C the graphical objects are horizontally arranged on the screen by aligning the start end of each of the graphical objects to a location offsets along the time axis, the offset based on the start times of the respective segment. As described above, the objects may be separated by a space, which may provide a clear visual representation of the segments and/or convey additional prosodic information (e.g., duration of pauses between voiced periods). In other words, the boundaries of two adjacent objects may be spaced apart, in some examples, by a distance based upon the duration of the unvoiced period between the two segments associated with the two adjacent objects. In case of FIG. 2C, illustrated is a visualization example of a speech input of the phrase "What if something goes wrong," vocalized by a native speaker and which in the Example in FIG. 2C was determined to include Segments #1-6, annotated and represented as [wʌt] [ɪf] [sʌm] [θɪŋ] [goʊ z] [rɔ ŋ] in IPA strings, respectively. As can be seen in the visualization example in FIG. 2C, the last segment "wrong" typically takes the longest amount of time when vocalized by the native speaker as is reflected by the length of the object 201-6 in FIG. 2C. In some embodiments, each object corresponding to each segment, either syllable or phoneme segment, may be additionally displayed with its corresponding IPA annotation or symbol. In some embodiments, the IPA annotation or symbol may be represented, using different font sizes, font styles, various types of emphasis signals such as bold, italics, underlined, or additional marks representing accents etc., which are easily recognized by a learner.

Referring now also to FIGS. 2D-2G, different variations of the visual expression or representation of speech are illustrated. Each of the visual representations in FIGS. 2D-2G visualize the same speech input (e.g., the same vocalization of the phrase "What if something goes wrong"). As noted, different aspects of the graphical objects 201 and their relative arraignment with respect to one another and/or a reference frame (not shown) may be varied to provide a visualization of the speech with varying level of richness (e.g., conveying different amount or types of prosodic information), while still maintaining an intuitive user-friendly nature of the visualization. In FIG. 2D, the visual expression (or visualization) 204-1 of the speech input communicates not only the duration and intensity of each segment (e.g., each syllable or phone unit segmented as previously described) through the length (L) and width (W) of each object 201, but also communicates pitch information through varying tilt or inclination of the object, vocalization pause information through the spacing between object, and phoneme information through the appropriate selection of color of each object. A simplified representation 204-2 of the same speech input is shown in FIG. 2E, where certain segment information, such as the duration and intensity, is communicated through the size of each object, and pause and phoneme information is communicated through spacing and color of the objects. In the example in FIG. 2E, the pitch contour information is not included, although in other examples similar to FIG. 2E, the tilt of the objects may still be varied to convey some pitch contour information (e.g., fundamental frequency) without varying the vertical offset of the objects, as in FIG. 2D, thereby omitting some other pitch contour information (e.g., offset of the fundamental frequency of a segment). FIG. 2F shows another example of visual representation 204-3 of a speech input, which is similar to the example in FIG. 2C, but utilizes a differently shaped oval than the ellipses used in FIG. 2C. In FIG. 2F, basic segment information, such as duration and intensity, is communicated through the size of each object, and durations of unvoiced periods (e.g., pauses in vocalization of speech) are communicated through corresponding spacing between the object. Pitch contour information may be omitted from the visualization, or at least some pitch contour information may be omitted. As described above, the tilt of the object in FIG. 2F may be varied, without varying their vertical offset, to communicate at least some information about pitch. All of the objects of a given visualization may be displayed in a same color, here a grayscale color (e.g., black) is shown but it will be understood that the single-color visualization may utilize any color (e.g., any RGB or CMYK color). In yet another variation, as shown in FIG. 2G, the graphical objects may be displayed in varying sizes (e.g., to convey duration and intensity information), in varying colors (e.g., to convey phoneme information) but pitch and pause information may be omitted. As shown in FIG. 2G, here the objects are arranged such that they are substantially adjacent to one another (e.g., the boundaries of adjacent object may be next to or in contact with one another even if there is an unvoiced period and irrespective of a duration of the unvoiced period between adjacent segments (e.g., syllable units). As will be appreciated, other variations that combine features of the visualization techniques described herein may be used to provide a simplified, user-friendly visualization of speech that conveys at least some prosodic information.

As previously discuses, optionally, a color may be assigned to each graphical object of a visual representation of speech, and in some embodiments, the color assignment may be based on the place and/or manner of articulation of a sound associated with that segment. For example, the color may be based upon the specific syllable or phoneme that's represented by a given segment. In examples in which a segment (e.g., syllable unit) has more than one phoneme, the color of the object may be selected based upon the first phoneme of the segment. In some embodiments, commonality in the place and/or manner of articulation may be reflected by commonality in colors used for object. For example, segments with sounds that have a common place of articulation (e.g., bilabial, labio-dental, etc.) may be assigned colors that are in a same color group (e.g., different shades or nuances of pink or violet, or different shades of orange, as shown in FIG. 3B.)

Figure 3A:
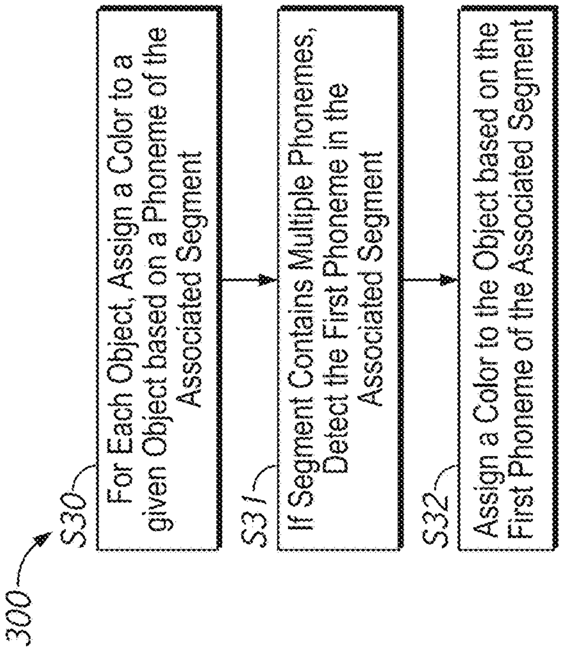
FIG. 3A is a flow diagram of generating a visual representation of a segment, in accordance with an embodiment of the present disclosure.

FIG. 3A shows a flow diagram of a process 300 for generating a visual representation of a segment, in accordance with the present disclosure that involves assigning a color to objects 301 of a visual representation of speech 304. The process 300 of assigning color to the object may be included as an additional, optional process/step in the process of creating the object for each segment (e.g., in step S241 of process 240). As shown at step S30, the SVE (e.g., processor 11) may assign color to an object based on a phoneme of the segment associated with that object. If a segment contains multiple phonemes, color may be assigned to the object based on the first phoneme of the associated segment (S32). To that end the SVE (e.g., processor 11) may determine the first phoneme in each segment (S31). Actual detection of phoneme may be performed in the segmentation process. Alternatively, for each syllable segment, phoneme segmentation may be performed to identify whether a segment has multiple phonemes and/or identify the first phoneme in a segment. The SVE (e.g., processor 11) may reference a look-up table when selecting a color to assign to object(s). In some embodiments, the look-up table may specify a unique color for each phoneme, such that when the phoneme or first phoneme of a segment is identified, the appropriate color may be assigned to the object. While phonemes are used in this example to select a color for an object, in other examples, a different parameter that is tied to the place and/or manner of articulation may be used for the color selection. For example, instead of assigning a unique color to each phoneme, all sounds that are associated with the same place of articulation (e.g., labial, labio-dental, etc.) may be assigned a same color. Thus, in such examples, a look-up table may alternatively or additionally identify a corresponding color for the different places and/or manner of articulation of sounds.

Figure 3B:
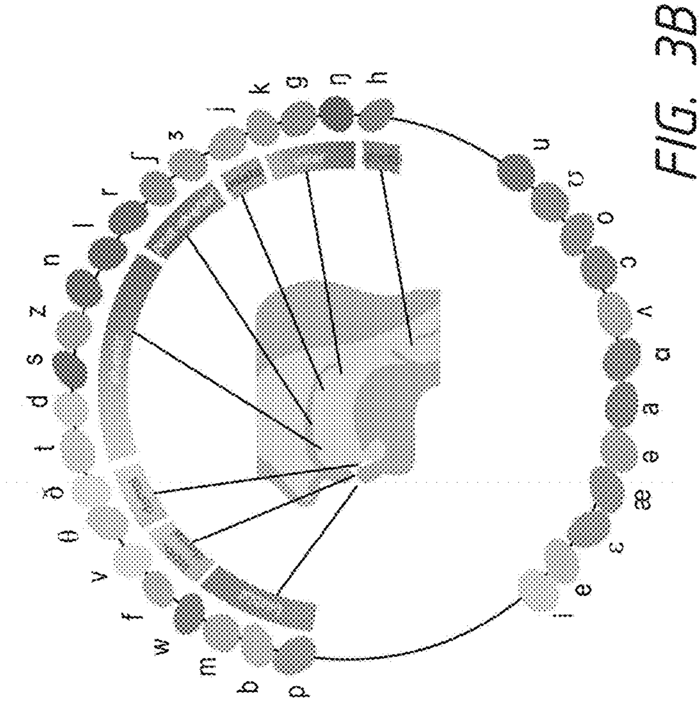
FIG. 3B is a schematic diagram showing a relationship between colors and phonemes including consonants, and locations of articulation associated with the consonants, in accordance with an embodiment of the present disclosure.

An example of such a color table is visually represented, at least in part, in FIG. 3B. The illustration in FIG. 3B shows a relationship between colors and phonemes that include consonants, and places (locations) of articulation in a vocal tract associated with the consonants, in accordance with an embodiment of the present disclosure. Graduation of colors may be associated and assigned to related consonants, e.g., the relationship being based on a location and a manner of articulation in a vocal tract. For example, labial consonant [p] [b] [m] and [w] produced at the lips may be grouped into the same group, and associated with the same color group (e.g., a pink-purple color group), and because of different manners of articulation, such as voiceless plosive, voiced plosive, nasal, and approximant, each of these phonemes may be associated with a different shades or graduation in the color group, namely assigning different graduation of color form pink to purple to these labial consonants in the present example. Similarly, there may be a gradual shift of a color assigned to a corresponding vowel, which may be based on gradual shifts in a position and an opening of a speaker's vocal tract that affect resonance distinctive to the vowel, typically extracted as lower format frequencies (e.g., $F_1$ and $F_2$). It will be understood that the specific colors and associations are provided merely as an example and in other embodiments, different associations between colors and phonemes/sounds may be used. After assigning color to each object (S32), the object(s) of a visualization 304 may then be displayed with the appropriate color to provide a richer visual expression of the speech.

Figure 3C:
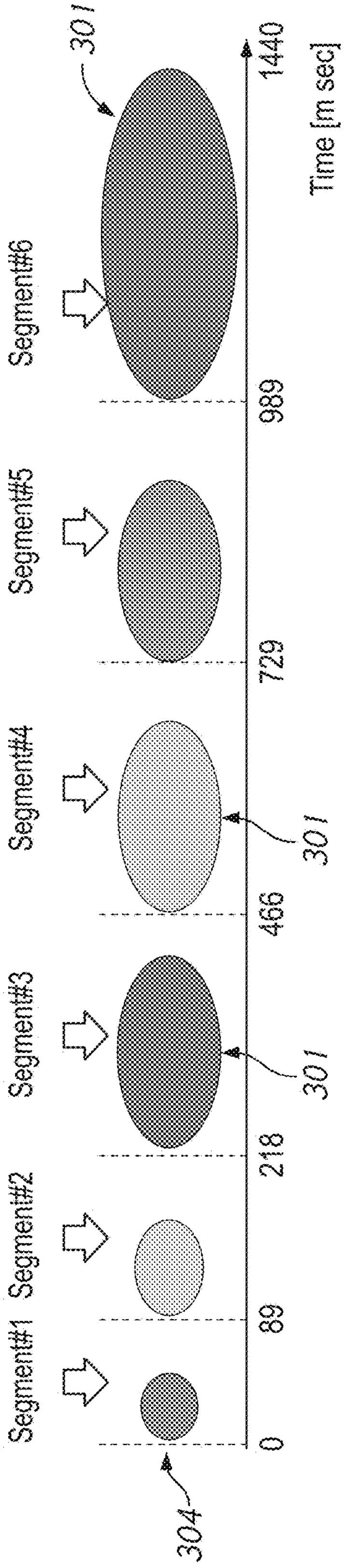
FIG. 3C is a timing diagram of a generated visual representation of speech, in accordance with an embodiment of the present disclosure.

FIG. 3C is a timing diagram of a generated visual representation 304 of speech, in accordance with an embodiment of the present disclosure. The visual expression 304 in FIG. 3C is of the same vocalization of the phrase "What if something goes wrong," shown in FIG. 2C and thus the size and arrangement of the graphical objects 301 is the same as that of the object 201 in FIG. 2C, with the difference here being that the objects have additionally been assigned a color based on phonemes found in the segments. In this example, the first phonemes of Segments #1-6 are [w] [ɪ] [s] [θ] [g] [r], thus, the objects associated with Segments #1-6 were encoded with colors purple, yellow, blue, yellow-green, dark grey, and dark blue, respectively, in accordance with the phoneme-color associations shown in FIG. 3B. The color associations shown in FIG. 3B may optionally be provided to the user (e.g., on a display or in a printed material) as additional training resources to aid the user in reading and familiarizing themselves with the visual guidance provided by the visualization (e.g., 304, 204-1, 204-4, etc.).

Figure 3D:
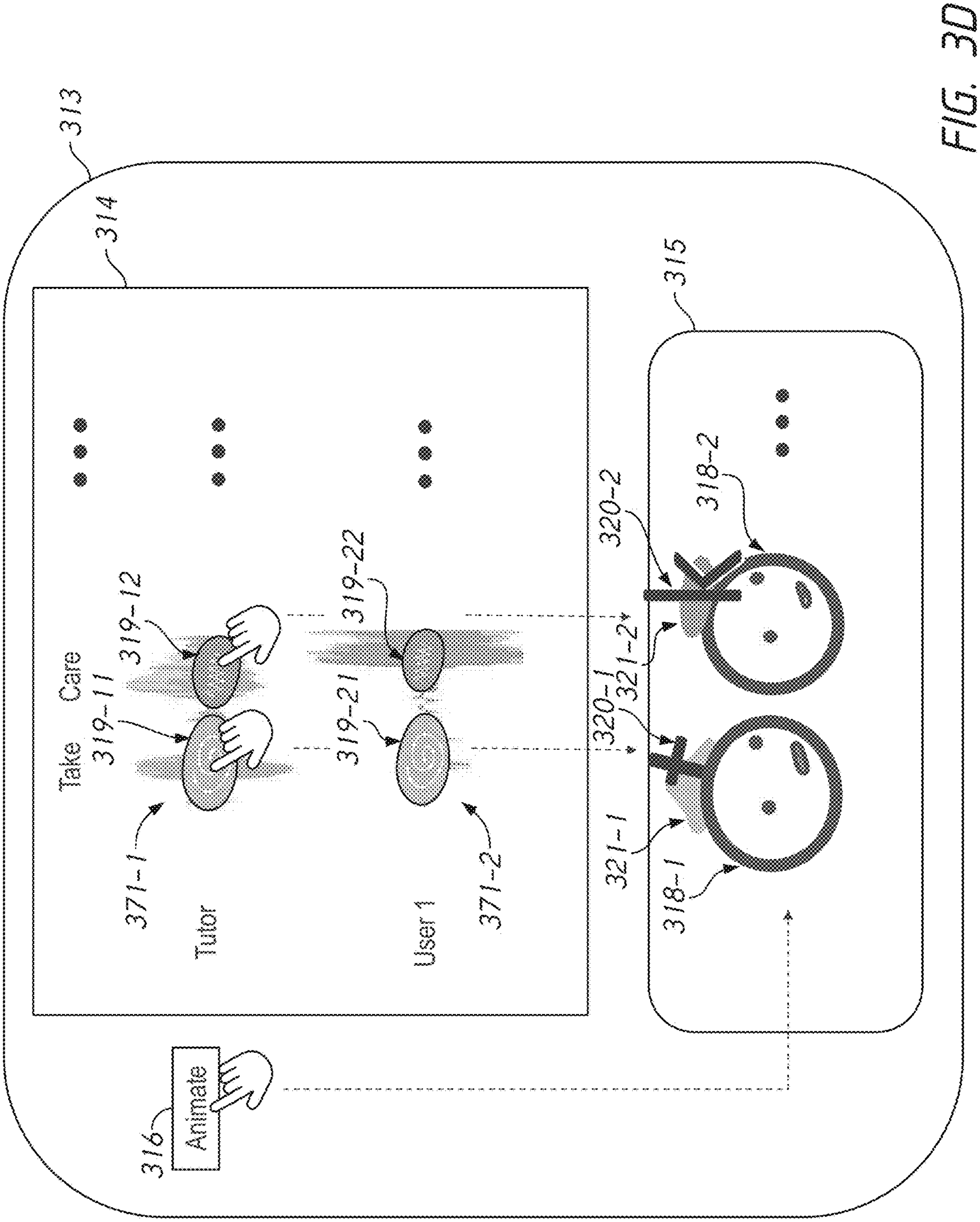
FIG. 3D is a schematic diagram of a screen including generated visual representations of speeches and facial representations associated with the speeches in accordance with an embodiment of the present disclosure.

FIG. 3D is a schematic diagram of a screen 313 including generated visual representations 317-1 and 317-2 of speeches and facial representations 318-1 and 318-2 associated with the speeches according to further embodiments of the present disclosure. In some embodiments, the screen 313 may be the display screen 13 of the apparatus 10. For example, the screen 313 may be a touch screen. The screen 313 may display windows 314 and 315. The window 314 may display the generated visual representations 317-1 and 317-2 of speeches, in accordance with an embodiment of the present disclosure. In some embodiments, the generated visual representations 317-1 and 317-2 of speeches may be timing diagrams, such as waveforms of the speeches. In some embodiments, the speeches may be excerpts of an identical phrase (e.g., "take care" in FIG. 3D) produced by two speakers (e.g., Tutor and User 1 in FIG. 3D). In some embodiments, a first generated visual representation 317-1 may show a reference speech provided by a native speaker of a language or a language teacher and a second generated visual representation 317-2 may show a user's speech (e.g., a learner's speech). In some embodiments, the generated visual representations 317-1 and 317-2 may include objects 319-11 and 319-12, and objects 319-21 and 319-22, respectively. A color may be assigned to one or more of the objects, in some cases to each of the objects 319-11, 319-12, 319-21 and 319-22. A different color (e.g., light blue or grey) may be associated with a different phoneme (e.g., [t] or [k]) in a speech, and thus different objects of the visual representations may be assigned different colors, corresponding to the phonemes of a given speech. The screen 313 may be configured to present an articulation instruction graphic (e.g., in the form of an animation or a static graphic) that provides user guidance on the location and/or manner of articulation of sounds of one or more of the phonemes represented in the given speech. For example, the screen 313 may display an icon 316, which when selected by a user, displays the articulation instruction graphic, e.g., in an auxiliary window 315. The content (e.g., visual representations 317-1 and 317-2 and facial representations 318-1 and 318-2) shown in two display windows 314 and 315 in FIG. 3D, may be presented in a single window, or may be provided in other suitable number of display windows, in other embodiments herein.

Referring to the specific, non-limiting example of FIG. 3D, the system may display, upon activation of the articulation instruction, a respective graphic or facial representation 318-1 and 318-2 for each phoneme or of a subset of the phonemes (e.g., the starting phoneme of each syllable) of the speech. The respective graphic or facial representation 318-1 and 318-2 may reflect a location and/or a manner of articulation of one or more sounds in the speeches (for example, the sounds [t] and [k] in the phrase or speech "take care" in FIG. 3D), optionally along with the associated waveforms. In some embodiments, the articulation instruction is keyed to (e.g., invoked by selecting the visualization elements of, or located proximate to) the reference speech, as to provide guidance on how to properly pronounce the speech to mimic the reference speech. The articulation instruction (e.g., facial representation 318-1 and 318-2) may be presented responsive to selecting the icon 316, which is not part of the speech visualization, or by selecting an element of the speech visualization, such as by selecting one or more of the objects 319-11 and 319-12. In some embodiments, selection of any of the objects of the visual representation 317-1 of the speech may cause only those facial representations associated with that object to be displayed, while selecting the icon 316 may cause the facial representations associated with each of the objects of the visual representation 317-1 to be displayed, e.g., as a sequence of facial representations. The facial representation associated with a given object may be visually associated therewith, for example by display a color that corresponds to the color of the given object. In some embodiments, individual ones of the facial representations 318-1 and 318-2 may be static, or they may be presented as an animation or videos reflecting locations and/or manners of articulation of representative sound, such as the manner in which the user should move their lips, tongue, mouth, etc. to properly pronounce a given sound.

Figure 4A:
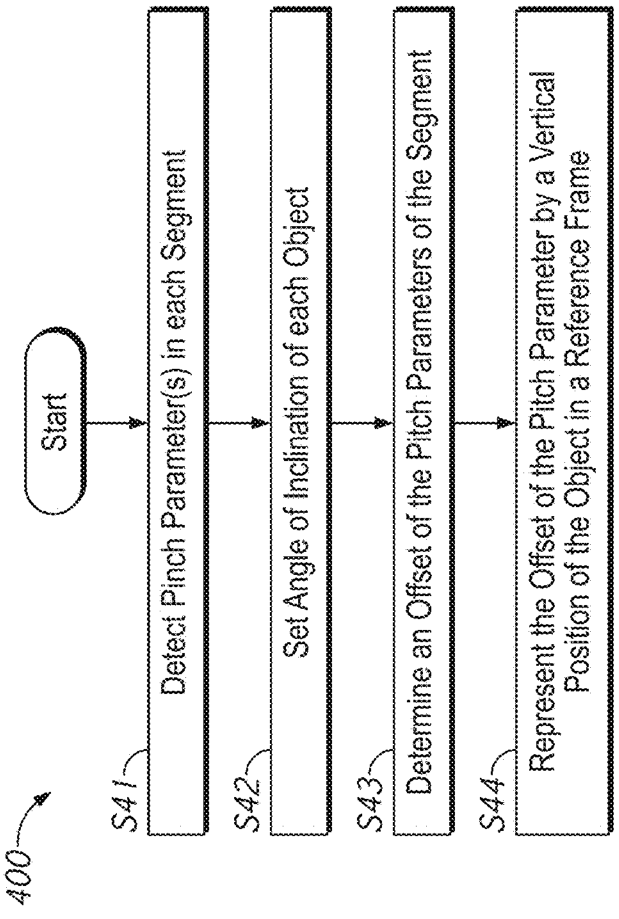
FIG. 4A is a flow diagram of generating a visual representation of a segment, in accordance with an embodiment of the present disclosure.

A pitch contour of a speech input may be represented graphically in accordance with the principles of the present disclosure. FIG. 4A is a flow diagram of process 400 for generating a visual representation 404 of a speech input in accordance with further embodiments of the present disclosure. The process 400 may be used to implement, in part, additional steps or processes (e.g., S243) of the process 240 of FIG. 2B. In the example of FIG. 4A, the process 400 involves arranging the objects in a manner that conveys pitch information of the vocalization and may thus be used to visually represent the pitch contour of the speech input. In other examples, the relative arrangement of the object created at step S241 of process 240 to provide a visualization (e.g., 204, 304, etc.) may involve different combinations (e.g., a sub-combination of the steps of process 400 or additional steps). The process 400 may include detecting pitch parameters (e.g., a fundamental frequency or other parameter representative of a listener's perception of pitch) for each segment (S41). A pitch contour may be developed that represents the movement of one or more physical parameters (pitch parameters) associated with the perceived height of a voice, such as fundamental frequencies traditionally. The pitch parameters are not necessarily limited to the fundamental frequencies, and other physical or physiological parameter that may affect a listener's perception of height of voice of the speech may be used as a pitch parameter. Based on the pitch parameters detected and pitch contour of the speech input, such as a gradient of rise or fall of the pitch e.g., detected as increase or decrease of the pitch parameters, a tilt (or angle of inclination) may be assigned to each object (S42). The tilt of an object can be seen as the angle between the longitudinal direction of an object and a reference horizontal axis (e.g., the time axis). In some embodiments, the process 400 may end there and the objects 401 of the visualization may then be displayed with their respective tilt, but substantially vertically aligned.

Additionally and optionally, the process 400 may include vertically arranging the objects (e.g., by vertically offsetting them relative to one another and/or a reference frame) to convey additional pitch information such as an offset of the pitch parameters of the segments (e.g., an offset of a fundamental frequency of the segment). This can be visually represented by the relative vertical position of the objects (e.g., with respect to one another and/or the reference frame) as shown in steps S43 and S44. In some examples, the reference frame relative to which a vertical offset may be determined may be based on a predetermined baseline or a minimum pitch parameter detected for a given speech input.

Figure 4B:
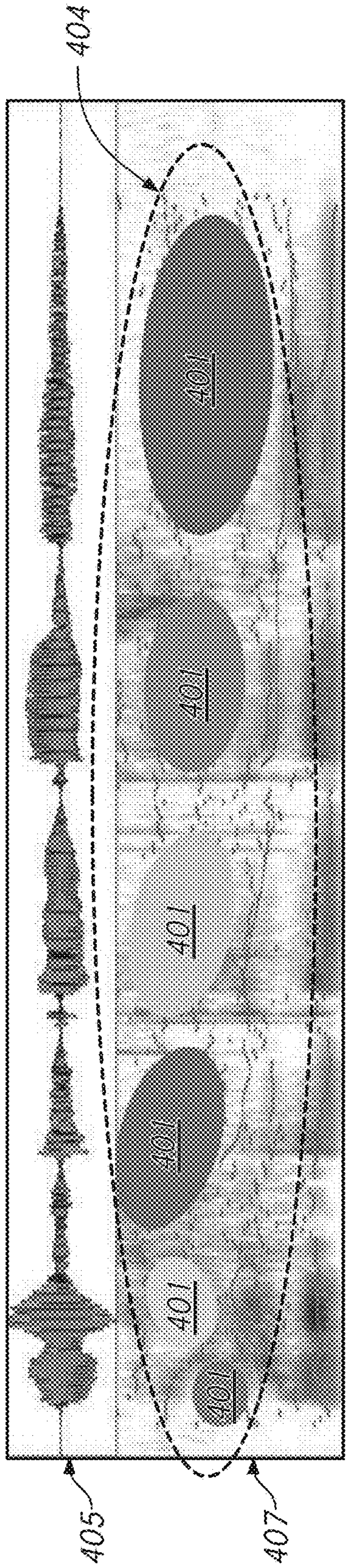
FIG. 4B is a timing diagram of a waveform, a spectrogram and a generated visual representations of speech overlaid on the spectrogram, in accordance with an embodiment of the present disclosure.

FIG. 4B shows a timing diagram of a waveform 405 and a spectrogram 407 of the same speech input as visualized in FIGS. 2C and 3C, but shown here visualizing additional prosodic information relating to pitch. The generated visual representation 404 of the speech input is shown overlaid on the spectrogram 407. As can be observed, while the information conveyed by the spectrogram 407 may be difficult if not impossible to be ready by a non-expert user, the visualization 407 that conveys at least some of the prosodic information included in the spectrogram 407 can be more readily understood by a non-expert user. In the overlay of the visualization 404 and spectrogram 407, shown here for illustration purposes only, the objects are visually aligned to an actual fundamental frequency contour shown by a set of blue dots, typically an annotation that may be extracted or added to a spectrogram by a trained/expert user, to illustrate how the visualization 404 can convey useful information about the prosody of the speech input to a non-expert user.

Figure 5A:
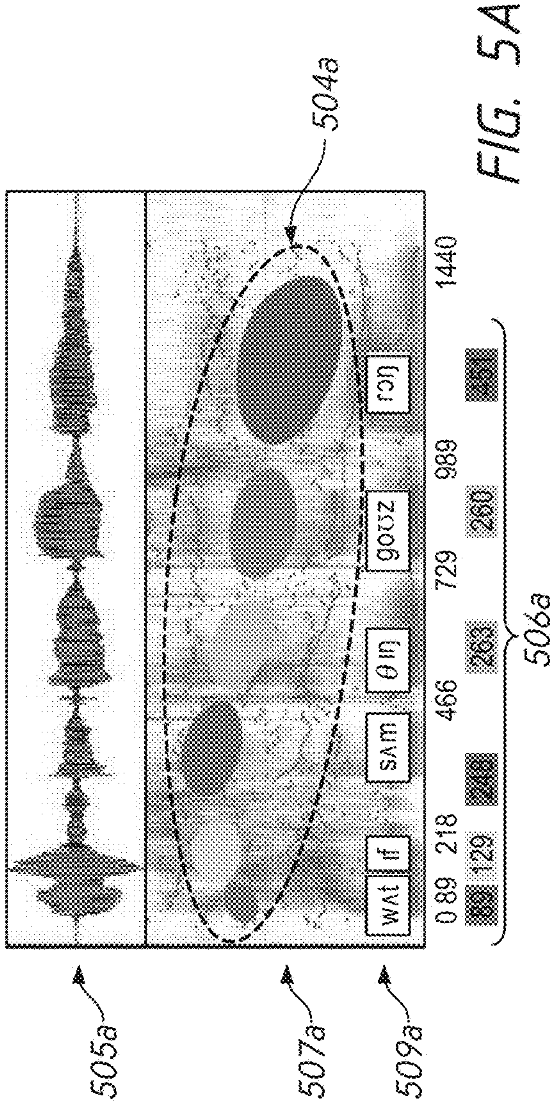
FIGS. 5A and 5B are timing diagrams of waveforms, spectrograms and generated visual representations of speech overlaid on spectrograms, in accordance with an embodiment of the present disclosure.
Figure 5B:
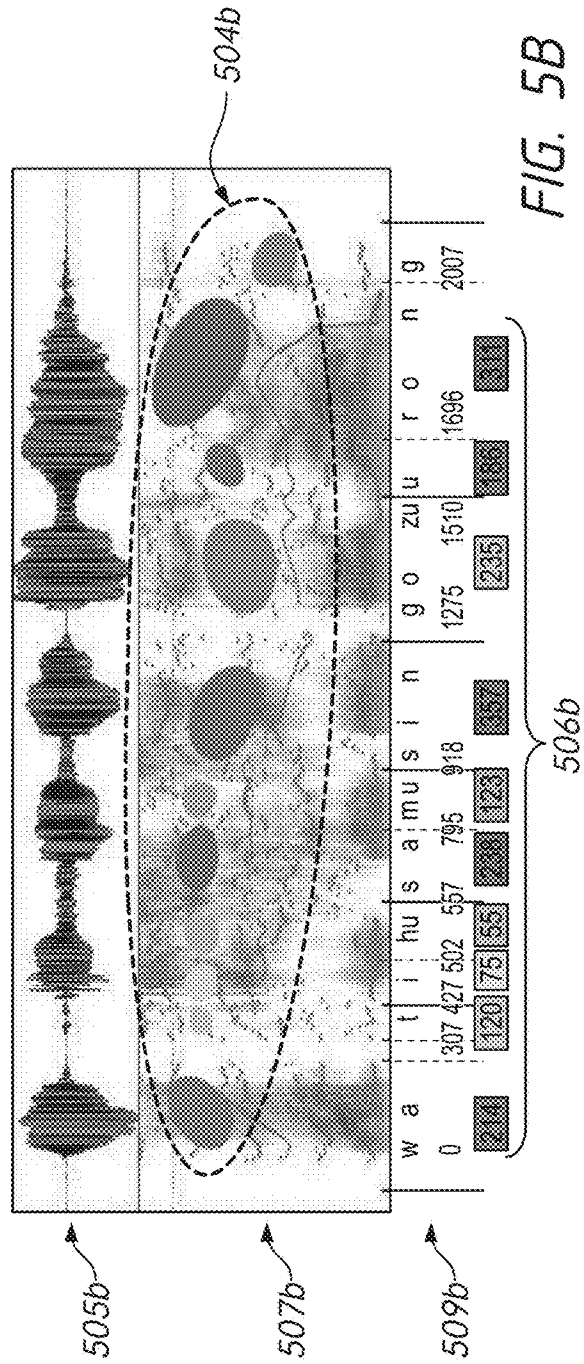

FIGS. 5A and 5B show waveforms 505*a* and 505*b* and spectrograms 507*a* and 507*b* of first and second vocalization of the same phrase. The first vocalization represented by waveform 505*a* and spectrogram 507*a* may be a reference vocalization (e.g., speech input by a native speaker for example in the context of a language learning application). The second vocalization represented by waveform 505*b* and spectrogram 507*b* may be a user vocalization (e.g., speech input by a language learner continuing with the language learning example). FIGS. 5A and 5B also show corresponding visual representations 504*a* and 504*b* of the first and second speech inputs, respectively, generated in accordance with the present disclosure and overlaid on the corresponding spectrogram. Shown also is certain timing information, including the duration of each of the identified vocalized segments (e.g., segment durations 506*a* and 506*b*) and starting and/or ending times of at least some of the segments. Shown also are segmentation details (e.g., symbolic representation of the segments 509*a* of the first speech input, and segmentation 509*b* of the second speech input). When compared to the first speech input (e.g., native speaker) in FIG. 5A, the second speech input (e.g., language learner) in FIG. 5B includes extra syllable segments created by vowel insertions, such as [i][hu] instead of [ɪf], and [sa][mu] instead of [sᴀm]. These discrepancies are well represented by temporal information provided by the graphical representations of the speech, such as the lengths of the objects with clear spaces between the objects, and thus can be easily visualized by a non-expert user. Also, several consonants are produced differently, such as [h] instead [f] and [s] instead of [θ]. These discrepancies are also well represented by colored objects representing syllable segments, and thus the differences can be easily perceived by a non-expert user. Also, vertical positions of the objects illustrate differences in pitch accent timings (e.g., a pitch accent is seen by relatively high vertical position of the $10^{th}$ segment in the learner's speech as compared to lack of such pitch accent at that location of the phrase in the native speaker's vocalization). All of the above provide examples of how visualization of speech according to the present disclosure may provide intuitive and easy to understand tool to aid a user in perceiving differences in their own pronunciation as compared to a reference pronunciation to help them improve their language skills.

Figure 6A:
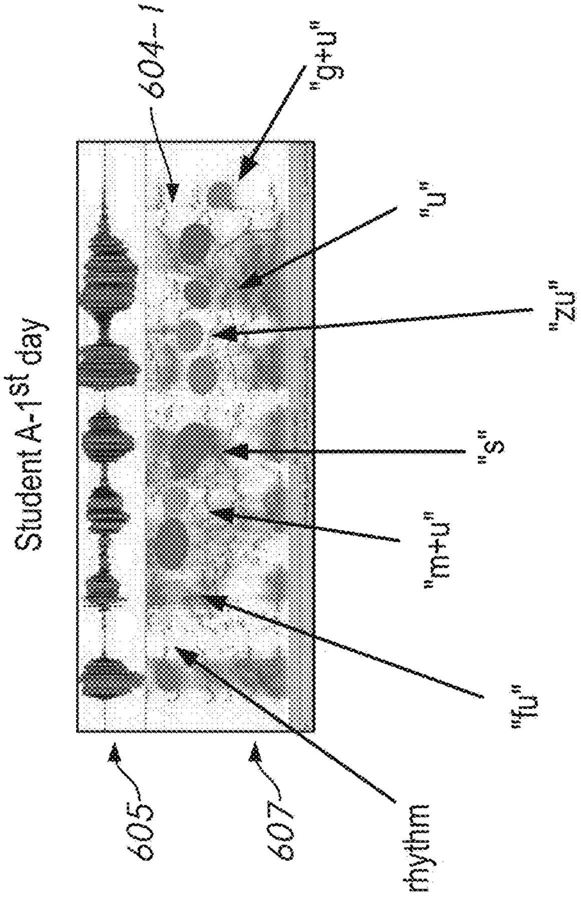
FIG. 6A is a timing diagram of a waveform, a spectrogram and a generated visual representation of speech overlaid on the spectrogram in accordance with an embodiment of the present disclosure.
Figure 7A:
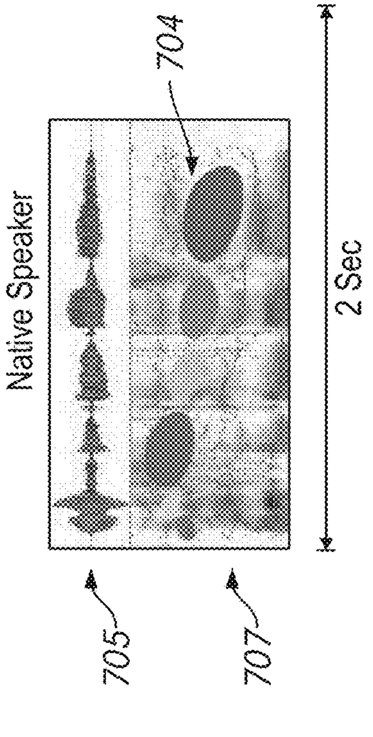
FIG. 7A is a timing diagram of a waveform, a spectrogram and a generated visual representation of speech overlaid on the spectrogram in accordance with an embodiment of the present disclosure.
Figure 6B:
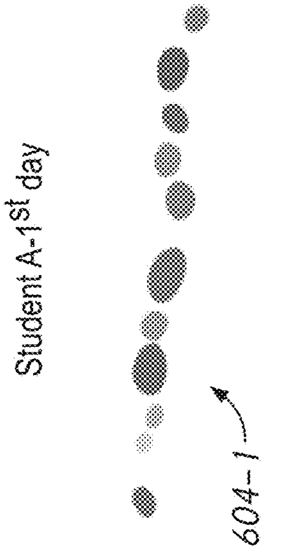
FIGS. 6B and 6C are schematic diagrams of generated visual representations of speeches in accordance with an embodiment of the present disclosure.
Figure 6C:
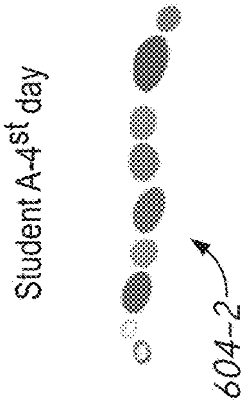
Figure 7B:
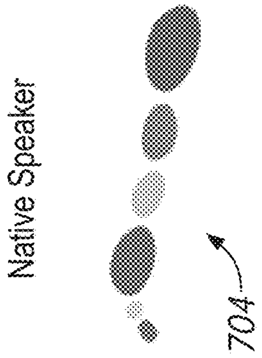
FIG. 7B is a schematic diagram of a generated visual representation of speech in accordance with an embodiment of the present disclosure.

FIG. 6A shows a waveform 605 and a spectrogram 607, plotted as a function of time, and associated visual representation 604-1 of a speech input by a user (e.g., language learner—student A) generated in accordance with the present disclosure is overlaid on the spectrogram. The visualization 604-1 in FIG. 6A is from a speech input obtained from the user at an earlier time during the learning process (e.g., day 1), which is also shown in isolation (from the spectrogram) in FIG. 6B, e.g., as it may be displayed on a screen of an apparatus (e.g., apparatus 10) that implements the visualization technique herein. FIG. 6C shows a visual representations 604-2 of a speech input obtained from the same user (e.g., language learner—student A) vocalizing the same phrase as in FIG. 6B but at a later time during the learning process (e.g., day 4). As can be seen by visually comparing the visual representation 604-1 in FIG. 6B and the visual representation 604-2 in FIG. 6C, changes in how the user vocalizes the same phrase can be easily observed from the differences in the graphical representations of object, even though the words spoken are exactly the same in both instances. FIG. 7A shows a waveform 705 and a spectrogram 707, plotted as a function of time, and associated visual representation 704 of a speech input by a native speaker vocalizing the same phrase as in FIGS. 6A-6C, which in FIG. 7A is overlaid on its corresponding spectrogram. FIG. 7B shows the same visual representation as shown in FIG. 7A in isolation, e.g., as may be displayed on a screen of an apparatus (e.g., apparatus 10) that implements the visualization technique herein. As can be seen from visually comparing the visual expression 704 of the speech input by the native speaker to the visual expressions 604-1 and 604-2 of the speech inputs by the user (e.g., language learner—Student A), the vocalizations of the two speakers have different prosody. As such, a user may use the visual representation 704 of a reference speech (e.g., speech of a native speaker as shown in FIG. 7B) as a reference or comparison to improve their vocalization of a foreign language (or to mimic vocalizations, such as specific dialect or accent, in their native language). As also shown in FIG. 6B, the total duration of the vocalization (e.g., speech input by Student A) on the first day is significantly longer and has been segmented into a larger number of segments, as visualized by larger number of object, as compared to the visualizations 604-2 and 704 in FIGS. 6C and 7B, because of vowel insertions (e.g., "fu," "m+u," "zu," "u" and "g+u") in their earlier, less practiced vocalization. Also, colors of some of the objects represented in FIGS. 6A and 6B are not found in FIG. 6C, and in FIGS. 7A and 7B, demonstrating that the user's vocalization (e.g., the manner and location of articulating sounds that correspond to the syllables in a phrase) changes over time, ideally becoming more similar to the target vocalization (e.g., the native speaker's vocalization). On the other hand, the visual representation of the speech by Student A on the fourth day in FIG. 6C looks more similar to the visual representation of the speech by the native speaker in FIG. 7B, at least, with respect to rhythm. The pitch contour shown by the vertical positions (or heights) of the objects, when comparing the visualizations in FIGS. 6A and 7A, demonstrate differences in the pitch characteristics of the learner's speech input as compared to that of the native speaker. While some of the vowel insertions have been eliminated as between the vocalization in FIG. 6B and FIG. 6C, it is still evident, from comparing the visualizations, that pronunciation of consonants in some segments is still different from the native speaker's reference speech, such as "s" instead of "θ" even at the later time (e.g., after some practice). With this visualization technique, e.g., by displaying the user's speech visualization near (e.g., above or below) the reference speech visualization, the user (e.g., language learner) can easily perceive the differences in theirs and the native speaker's speech so the user can practice and improve towards the target vocalization.

Figures 8A, 8B, 8C:
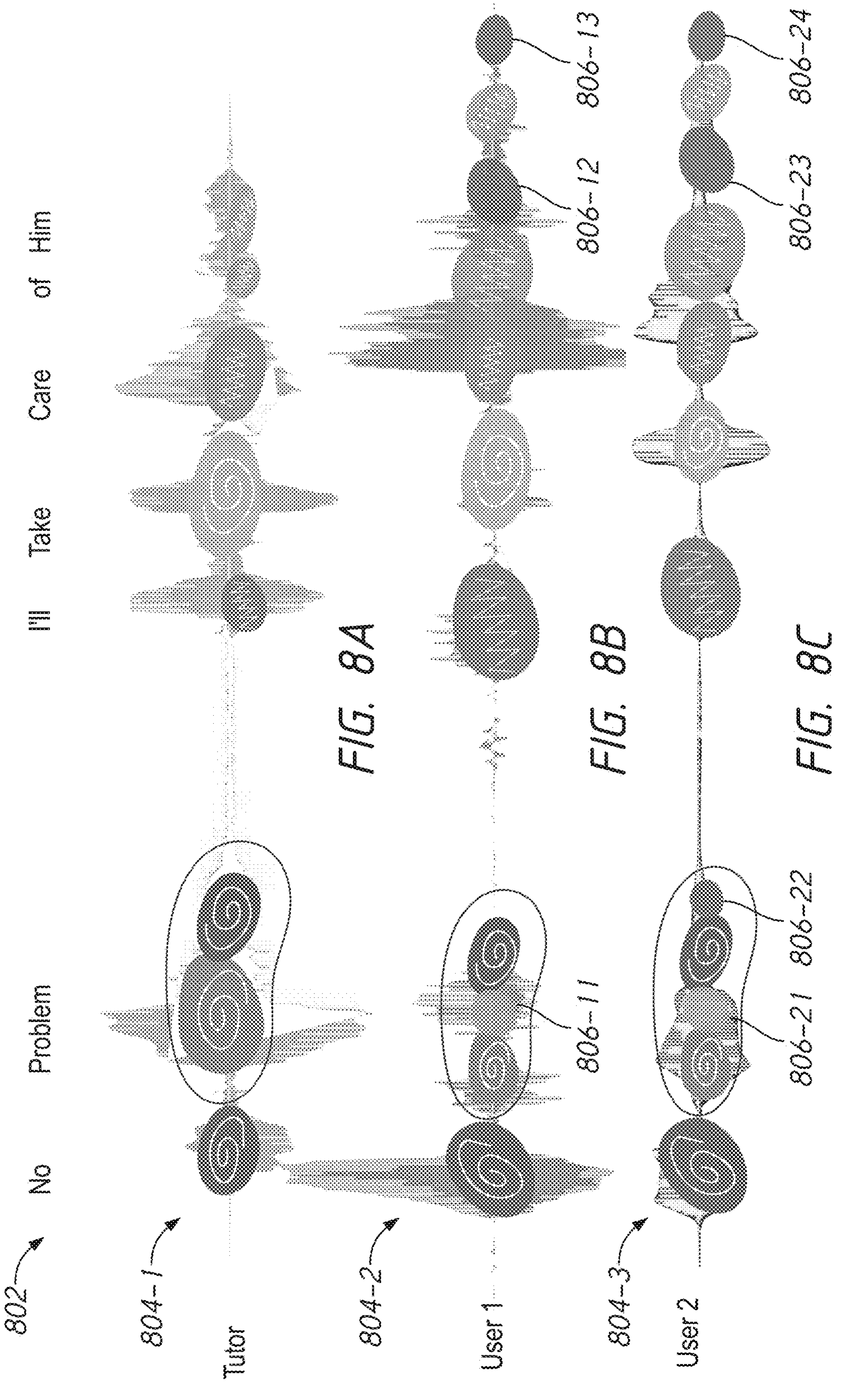
FIGS. 8A to 8C are schematic diagrams of generated visual representations of speeches in accordance with an embodiment of the present disclosure.

In some embodiments, such as when implementing a language learning or other speech practice application in accordance with the examples herein, an apparatus may display the visualizations of the user (e.g., learner) and the visualization of the reference speech (e.g., native speaker) with their start points (first ends) substantially vertically aligned. FIGS. 8A-8C are schematic diagrams of generated visual representations 804-1 to 804-3 of speeches in accordance with an embodiment of the present disclosure. In some embodiments, a visualization of reference speech (e.g., the generated visual representations 804-1) may be displayed near (e.g., substantially vertically aligned with) the visualization of a user's speech (e.g., generated visual representation 804-2 or 804-3). In the examples in FIGS. 8A-8C, the generated visual representations 804-1 through 804-2 include a visualization of the same speech, i.e. of an identical phrase 802, or an excerpt thereof, (e.g., "No problem, I'll take care of him." in FIG. 8A) produced by three different speakers (e.g., Tutor in FIG. 8A, User 1 in FIG. 8B, User 2 in FIG. 8C). In some embodiments, the generated visual representation 804-1 may include objects that are visual representations of segments in a reference speech provided by a tutor (e.g., a native speaker or a language teacher) and the generated visual representation 804-2 and 804-3 may show objects that are visual representations of segments in speeches produced by language learners (e.g., User 1 and User 2), for example. In some cases, the objects may be displayed together with (e.g. overlaid on) the timing diagram and/or waveform of the recorded speech from which the visualization is produced. In some embodiments, to facilitate language practice, a screen of a computing device associated with User 1 may display the generated visual representations 804-1 of the Tutor and the generated visual representation 804-2 of the User 1, e.g., substantially vertically aligned. In other embodiments, the two speech visualizations may be otherwise suitably arranged to be in proximity on the display, such as side by side. The visual representation 804-2 of User 1 in this example includes, among others, the objects 806-11, 806-12 and 806-13 which may correspond to vowel insertions (e.g., "b+u," "vu" and ""m+u") that may not present in the visual representation 804-1 of the reference speech (e.g., of the Tutor). Similarly, a screen of a computing device associated with User 2 may display the generated visual representations 804-1 and 804-3 of Tutor and User 2, respectively. The visual representation 804-3 of User 2 may include, among others, the objects 806-21, 806-22, 806-23 and 806-24 which may correspond to vowel insertions (e.g., "b+u," "m+u," "vu" and "m+u") that may not present in the visual representation 804-1 of the reference speech. By presenting the user's visualized speech in proximity to the visualization of the reference speech, the system may further aid the user (e.g., learner) in identifying differences and monitoring their progress towards mimicking the "proper" pronunciation of a word, phrase, etc.

Figure 9:
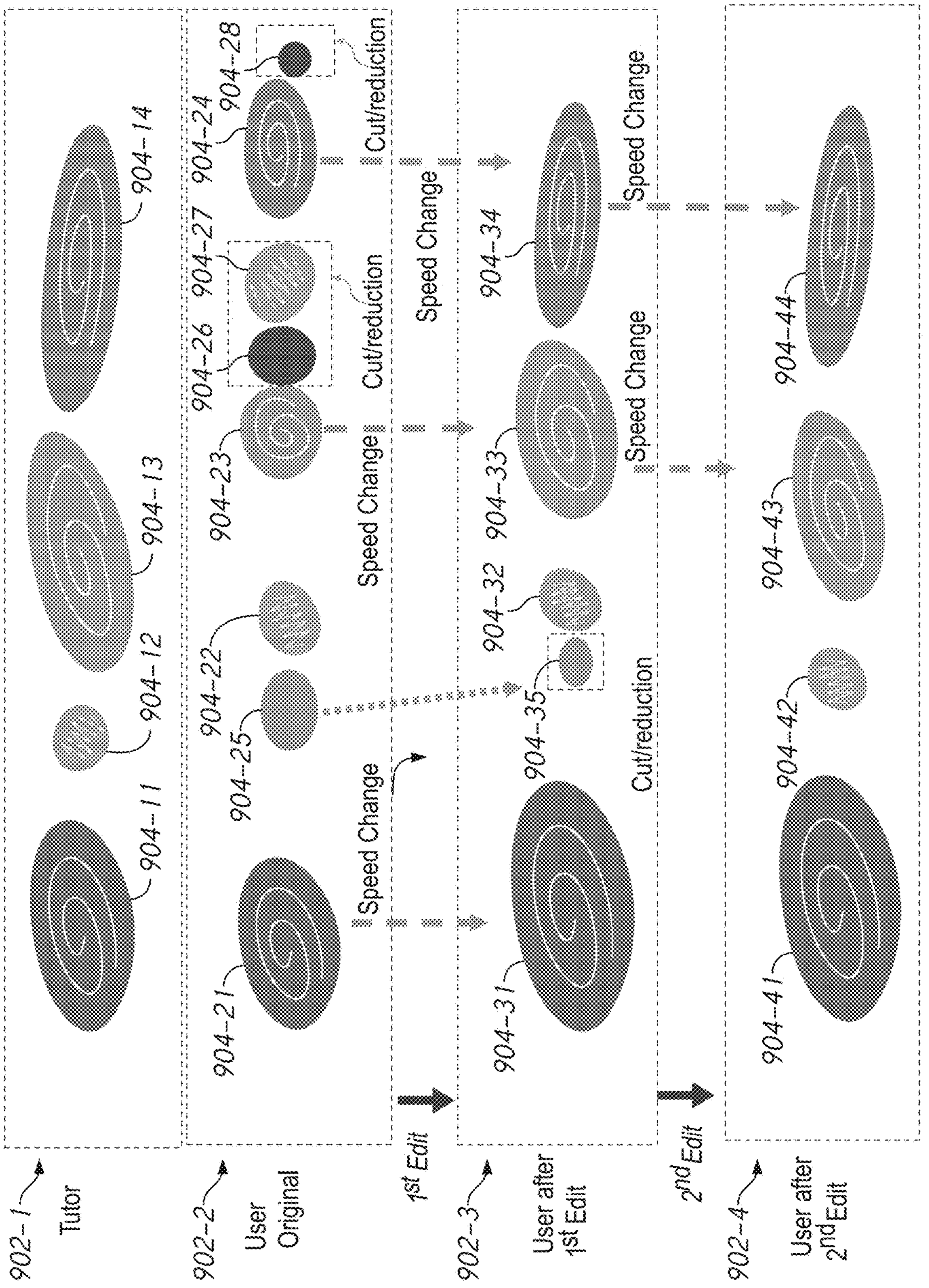
FIG. 9 is a schematic diagram of a flow of modifying visual representations of speeches in accordance with an embodiment of the present disclosure.

In some embodiments, such as when implementing a language learning or other speech practice application in accordance with the examples herein, an apparatus may be configured for editing visualizations of the user's speech. Such editing may be performed by the apparatus either responsive to user inputs (e.g., the user specifying the edits to be made to the vocalized speech, or automatically by the apparatus, so as to aid the user in visualizing possible improvement trajectory for their speech practice. As discussed herein, visualizations of the user's speech and a reference speech may be displayed concurrently (e.g., arranged vertically on the screen or side by side) to enable the user to review differences between the visualization of the user's speech and the visualization of the reference speech (e.g., native speaker). The user's speech vocalization may then be edited such as by changing (e.g., increasing or decreasing) the speed of select syllables or other segments of the speech, by reducing or amplifying the level of sound, by reducing or prolonging pauses between vocalized segments, cutting or reducing one or more sounds (e.g., to remove vowel insertions typically to native Japanese speakers), and/or applying other modifications. FIG. 9 is a schematic diagram of a flow of modifying visual representations of speech in accordance with the present disclosure. FIG. 9 shows a visual representation 902-1 of a reference speech (e.g., of a Tutor), which may be displayed concurrently with one or more visual representations of speech of a user (e.g., visualizations 902-2 to 902-4) each of which may visually represent, using objects, various properties of the vocalized speech and segments thereof. The visual representations 902-1 through 902-4 correspond to different vocalizations of the same speech, i.e. different vocalizations of the same word or phrase, as produced by different speakers (e.g., Tutor and User in FIG. 9).

In the example in FIG. 9, the generated visual representation 902-1 includes four objects 904-11 to 904-14 that are visual representations of segments of a reference speech (e.g., a native speaker or a language teacher), labeled in FIG. 9 as Tutor. The generated visual representation 902-2 of the same speech vocalized by a user includes 8 objects 904-21 to 904-28 that are visual representations of segments of the vocalization of the same speech but produced by a user (e.g., a language learner). As can be seen, the user's vocalization includes additional objects not present in the reference speech vocalization, and the properties (e.g., length, incline, etc.) and/or spacing of one or more of the objects are different as between the two visualizations. For example, the objects 904-21 to 904-24 of the visualization associated with the user correspond to the objects 904-11 to 904-14 of the reference speech representing syllables included in the reference speech. On the other hand, the objects 904-25 to 904-28 of the user's visualization are not present in the reference speech and may represent syllables which are not part of the reference speech. For example, the syllables not included in the reference speech may be due to vowel insertion or incorrect pronunciation. The visual representation may facilitate editing of the user's vocalization, such as by the user selecting and specifying the changes to be applied to one or more of the objects in their vocalization, or by the system (e.g., the SVE) automatically determining the differences between the user's and the reference vocalization and incrementally presenting an edited user vocalization as feedback to assist the user in making incremental improvements to their vocalization. In one example, the user may edit the generated visual representations 902-2, using one or more editing steps. For example, in a first editing step, the objects 904-21, 904-23, and 904-24 may be edited to decrease the speed of pronunciation of the corresponding syllables, visually corresponding to an expanding these objects. The object 904-25 may be shrunk, either responsive to the user directly editing the object in this manner or as a result of the enlargement of the preceding object 904-21. Thus, when the visualization 902-3 of user speech after editing is played back, the syllables represented by the objects 904-21, 904-23, 904-24 and 904-25 would be produced slower and faster, respectively. Further edits may be made, such as to cut or remove one or more objects that are not present in the reference speech, such as object 904-26 and 904-27 between the objects 904-23 and 904-24, and the last object 904-28, thereby reducing the total number of sounds/syllables in the user's edited vocalization. A visual representation (e.g., 902-3 and 902-4), which represents modified vocalization(s) by the User of the same speech may be generated for display. The editing process may be performed in one step (e.g., from the "User Original" vocalization to arrive at the "User after $2^{nd}$ edit" vocalization) or in multiple step as shown in the illustrated examples, which may provide guidance for targeted incremental improvements as the user continues to practice. In the example in FIG. 9, a $2^{nd}$ editing step is shown in which the object 904-35 from the first edited user vocalization is removed, and the speed of the objects 904-33 and/or 904-34 may be further adjusted (e.g., increased) to arrive at the vocalization, indicated by visual representation 902-4, including the same number of objects (904-41-904-44) as in the reference speech. As such, the final edited speech vocalization, including the objects 904-31 to 904-34, which correspond to the objects 904-11 to 904-14 included in the reference speech, may include the same number and substantially similarly pronounced syllables, even if by a different user, as is captured in the reference speech.

While the example in FIG. 9 illustrates modifications including changing speeds, cutting/reducing syllables, changing the timing of the start or end of a syllable, the modifications provided by a system according to the present disclosure may not be limited to the ones specifically illustrated herein. For example, the apparatus may enable various other modifications or any suitable combinations thereof, for example, reducing or amplifying a level of each sound, reducing or prolonging a pause between sounds, etc.

Figures 10A, 10B, 10C, 10D:
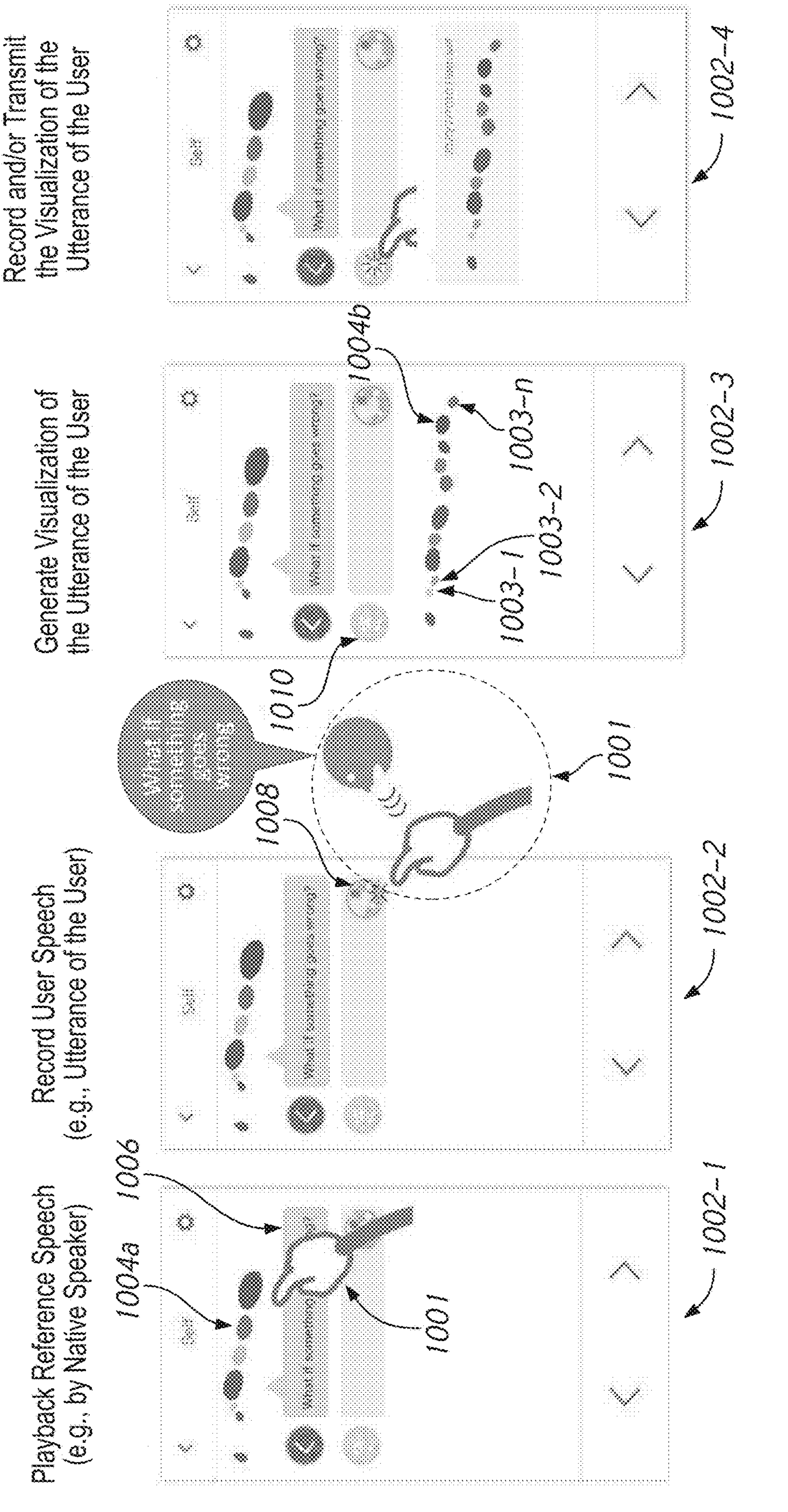
FIGS. 10A to 10D are schematic diagrams of an apparatus that provides a language learning system including a generated visual representation of speech on its touch screen in accordance with an embodiment of the present disclosure.

Embodiments of the present invention may be implemented by an apparatus (e.g., a computing device) that provides a language learning system or application. An example embodiment is described further with reference to FIGS. 10A-10D, which show screen captures of a display screen of a computing device configured to generate and/or provide a visual representation of speech in accordance with the present disclosure. The computing device may be a portable computing device (such as a tablet or smartphone) and may include a touch screen. The visual representation of speech in accordance with any example herein may be displayed on the computing device's touch screen. For example, the screen shots of the user interface shown in FIGS. 10A-10D may be displayed on a touch screen of the apparatus 10 of FIG. 1. In other embodiments, the visualization is provided on a display screen which is not touch sensitive and user inputs may be received via an input device other than a touch screen. The apparatus may execute a program of the language learning system, a component of which may be the generating of visual representation(s) of speech. Different types of speech may be visualized as part of the language learning program. For example, as shown in FIG. 10A, the processor of the apparatus (e.g., smart phone) may use the visualization process described herein, which may be embodied in computer-readable instructions (e.g., stored in the memory 12 as an application ("app")), to generate a simplified visualization 1004*a* of reference speech, which may also be stored in the memory 12. In the screen shot 1002-1 shown in FIG. 10A, the apparatus has displayed a visual representation of the reference speech, e.g., speech provided by a native speaker, on the touch screen. In addition to the simplified visualization 1004*a*, an audio representation (e.g., audio playback) of the reference speech may be optionally provided to the user, before, together with or after the visualization 1004*a* is displayed. The audio playback may be provided responsive to a user command (e.g., responsive to a tap of a user control or the visual representation of the reference speech on the touch screen). The audio representation of the reference speech may also be pre-stored as an audio file in the memory 12. The audio representation (e.g., playback) may be provided to the user from an audio output 15 that may be coupled to either the internal speaker of the computing device or an external speaker (e.g., a headset connected to the computing device via wire or wirelessly). In some embodiments, playback of the reference speech may occur automatically such as after a predetermined period of time following or preceding the display of the simplified visualization, or in some cases simultaneously with the simplified visualization. In some embodiments, initial playback of the reference speech may occur automatically. In some embodiments, the user control enabling the user to command audio playback may be the visualization 1004*a* of the reference speech, or a separate user control configured to playback the reference speech may be provided. The app may be configured to enable the user 1001 (e.g., language learner) to tap the visualization of the reference speech as many times as the user wishes before moving to the next step, and the apparatus may play the reference speech multiple times, e.g., as commanded by the user. In some embodiments, a text string 1006 of the reference speech may also be displayed. As described, while the text string 1006 may lack any prosodic information about the vocalized speech, the visualization 1004*a* may convey prosodic information to aid the user in their language learning experience. In some embodiments, the displaying of the visualization 1004*a* may include displaying an animation of the objects of the visualization, which may accompany the playback of the speech (either the speech vocalized by the learner and/or a playback of the reference speech) in real time. For example, when each segment (e.g., syllable) of the speech input is played back, the corresponding object of the visualization may be animated (e.g., newly appear, be highlighted, may move such as by trembling, blinking, changing in size, moving along a trajectory, etc., if already displayed, or be otherwise animated) substantially in synchrony with the segment being played back. As one specific but non-limiting example, an animation may include enlarging, brightening, or otherwise highlighting the object corresponding to a segment (e.g., syllable) the intensity of which is higher (e.g., a stressed syllable) as compared to a preceding segment. In another specific but non-limiting example, the object may move, in the visualization, in a trajectory corresponding to an fall or increase of a pitch parameter of its associated segment, such as due to an accent or at a phrase end (e.g., at the end of a vocalized question). Any of the animation examples herein may be used in combination to provide a richer visualization that may be seen as more closely representing the prosody in the speech in real time. Such animation of prosodic expression in real time as described herein may provide an improved learning tool that enhances the user experience as a learner is practicing vocalizing and listening to speech in a new language (or in a particular dialect of a given language).

The apparatus may further display a user control (e.g., record icon 1008) which is configured to enable the user (e.g., language learner) to record their own speech on the apparatus. As shown in the screen shot 1002-2 in FIG. 10B, the user (e.g., language learner) may select this user control (e.g., taps the icon on the touch screen), responsive to which the apparatus enters a recording mode, and a recoding function of the apparatus is activated that uses a microphone (e.g., embedded or communicatively coupled to the apparatus) to record the user's speech. For example, in the apparatus 10, the processor 11 may activate the microphone input 14 so that either the internal microphone or the external microphone coupled to the microphone input 14 detects sound pressure of a voice produced as a speech by the language learner, thus recording of the speech is performed. The recording of the speech may be temporarily (e.g., for the duration of the language training session or a portion thereof) or permanently (e.g., until expressly deleted by the user) stored in a memory of the apparatus, such as the memory 12 in FIG. 1. In one embodiment, the apparatus may then execute the segmentation process of FIG. 2A to process the recorded speech of the user 1001 (e.g., language learner). In another embodiment, the apparatus may send the user's recorded speech to a remote server. The remote sever may execute the segmentation process of FIG. 2A to the recorded speech of the language learner and send the segmentation result of the recorded speech back to the apparatus. After the user's recorded speech has been segmented, the apparatus may execute the process (e.g., the process of FIG. 2B) for generating a visual expression 1004*b* of the recorded speech, such as by creating the graphical representation including the objects 1003-1, 1003-2, through 1003-*n* that represent the segments of the user's recorded speech. As can be seen from the screen shot 1002-3 in FIG. 10C, the visualization 1004*a* of the reference speech and the visualization 1004*b* of the user's recorded speech, both of which are generated using the same visualization process show differences, which may be primarily due to differences in the prosodic information of the two different vocalizations of speech (one reference and one user) rather than the content (e.g., the text string) of the vocalized speech. In this manner, the simplified visualizations may enable a user to easily perceive the difference between native speech and the user's (e.g., learner's) own speech to aid the user in their speech learning processes. As is further shown in FIG. 10C, the apparatus may display, together with the graphical representation of the objects on the touch screen, additional user controls (e.g., a record icon) configured to enable the user to save the visualization 1004*b* (e.g., the graphical representation of the objects 1003-1, 1003-2, etc.) of that instance or any subsequent vocalization of the user, as further shown in FIG. 10D. Responsive to user command (e.g., the tapping of the record icon 1010), or in some embodiments automatically upon generation of the visualization 1004*b*, the apparatus may save the visualization 1004*b* in the memory 12 permanently (e.g., until expressly deleted by the user). The visualization 1004*b* of the user's vocalization may be time-stamped and/or otherwise tagged to enable sorting, searching, report generation, and other subsequent processing of stored visualizations of user vocalizations. By tagging and storing these visualizations, the language learner's progress can be observed, such as by displaying together the stored visualization obtained over time. While described here in the context of language learning, for example when a non-native speaker wishes to learn a foreign language, embodiments of the present invention, such as the embodiment described with reference to FIGS. 10A-10D may be used for other purposes, for example to practice narration, such as for acting, for learning a different accent or dialect of a same language, or any other type of speech practice or training. Other uses of the speech visualization tool described herein may be to practice self-help through vocalizing phrases. For example, a habit-forming practice or tool may be built utilizing the visualization technique herein, where word phrasing may be used as part of the habit-forming process.

In addition to language learning apps, other use cases are conceived for the visualization technique described herein. For example, a communication app may be built around the visualization technique described. In some embodiments, the visualization generated by the processes described herein can be user-generated content that can be shared with others. In one such example, a messaging application, such as a text or video messaging app of a smart phone) may be integrated with a visualization feature where a speech visualization, generated according to any of the examples herein, is provided instead of, or in combination with any other (e.g., text, image, video) message shared via the messaging app. This may enable, particularly in the case of text messaging, to convey information (e.g., prosodic information) that cannot be conveyed by the text alone, for example emotional nuances, granularity, etc. of a spoken message.

Furthermore, communications via text alone (e.g., text messaging) may sometimes be too direct, matter-of-fact, or too straightforward and may not facilitate having an impactful communication. The visualization techniques described herein can be used to imbue such direct, matter-of-fact communications with emotional nuances, which may provide for a more impactful communication. This can apply not only to text messaging but also in the fields of teaching, coaching, mentoring, counseling, therapy, and caring (remotely). In the context of teaching, the visualization techniques herein convey measurable data about the speaker's speech abilities, which can be tracked over time, and practice and progress can also be tracked using the data associated with visualizations created according to the techniques herein. The measurable data may further be collected over time and the collected data can be used for various purposes. In particular, practice data of learners may be useful for the learners themselves, an educators or staff supporting the learners, or other users associated with the learner. For example, the system may analyze quality of speech in a quantitative manner, by counting the numbers of objects in visualizations created from the learner's speech. Each object representing a segment (e.g., syllable, phoneme, etc.) may be considered as a unit of physical muscle practice. In a language (e.g., English) learning practice, a learner can achieve a certain number (e.g., a million times) of segment production, as represented by objects in a visualization, which are then counted. In one specific but non-limiting example of a language (e.g., English) learning course implementing the visualization techniques described herein, the user (e.g., language learner) may practice listening and vocalizing, for example daily (or at different frequency, e.g., 3 times a week, 5 times a week, etc.). A given such (e.g., daily) practice session may take a certain period of time (e.g., 15-30 minutes depending on the user) and thus a user may spend about 15-30 minutes (or a different duration of time) per day practicing the language. During a practice session, the user may be asked to practice a certain number of phrases, say 20-25 phrases, each having a certain number of syllables, say 8-9 syllables per phrase. Continuing with this specific examples, if a user repeats this number of phrases for a certain number of times, say 14 times, in a given practice session, the user would have produced over 3,000 segments of vocalization, and if the user practices each day, for example, that would amount to over 1 million units of vocalization, which can seem a significant and unsurmountable challenge on the macro scale (e.g., annually) but which, when broken down per practice session or vocalization units may seem more accessible to a user starting to learn a language and thus may help motivate them in their language practice. Also, communicating to the user the total number of segments produced on the macro level (e.g., over a year) may be motivating to a user as illustrating to them how daily, step by step practice can build up over time and achieve significant results of vocalization/muscle practice. Thus, measurable data, such as object counts in visualizations, that can be obtained from the visualizations, and which would otherwise not be available if a user is simply vocalizing/practicing without any visual feedback, may be useful for analyzing both qualitative and quantitative aspects of speaking practice. Furthermore, the objects in visualizations may be useful for other purposes, such as user behavior analysis. Various techniques in the field of the data science technology may be applied, individually and collectively, to the collected data over time (e.g., in repeated vocalizations and associated visualizations in various manner) to extract additional qualitative and/or quantitative information.

For various other applications, a person's speech can be further characterized based on the prosodic information contained and conveyed via the current visualization method and this information can be used by other devices, systems or processes, for example for creating an avatar or other proxy of the user, or for use by an AI speaker (such as Google Home, Alexa, Siri devices, etc.), which can utilize the prosodic information of a given user either to mimic or for better comprehension of the user's communication therewith. Also, while the visualization technique is described here by way of generating and displaying graphical objects (e.g., ovals, rectangles or differently shaped objects) on a display, the visualization that includes discrete graphical objects may in other instances be replaced by the illumination, in a sequence, of a discrete (or a group of discrete) light emitting devices of a suitable electronic device. In some examples, an empathetic computing device as described in U.S. Pat. No. 9,218,055 (Sakaguchi et al.), U.S. Pat. No. 9,946,351 (Sakaguchi et al.), and U.S. Pat. No. 10,222,875 (Sakaguchi et al.) can be used to express the visual expression of speech described herein. The aforementioned patents are incorporated herein by reference, in their entirety, for any purpose.

FIGS. 11A to 11E are screen captures of an apparatus that provides a speech visualization according to further embodiments of the present disclosure in combination with a text representation of the speech. In some embodiments, user interfaces as shown in the screen captures in FIGS. 11A-11E may be generated by and provide on a display of a portable computing device (e.g., a smartphone). Thus, in some examples, an apparatus according to the present disclosure may be a smartphone which implements the apparatus 10 of FIG. 1, and has a touch screen that implements the display screen 13 of the apparatus in FIG. 1. The apparatus (e.g., smartphone) may be configured to execute a program (e.g., a text messaging app) that provides a text messaging service to a user. The text messaging app may be enhanced with speech visualization according to the present disclosure. In some embodiments, the visualization may be performed on speech that is recorded in real-time (e.g., as the user is using the text messaging app) and which may be converted to text to be sent via the text messaging app, along with the visualization(s) 1104, or the visualization 1104 may be sent in place of the text representation (e.g., the user's text message). In other embodiments, the apparatus may use a model that models the user's vocalization of speech to visualize text messages typed on the apparatus, such that the visualizations can be shared with others as user-generated content. The enhanced text messaging application may be implemented by an application ("app"), which is equipped with a SVE (or components thereof) which is may be retrieved from the cloud and/or optionally stored in the memory 12 of the apparatus 10.

Figures 11A, 11B, 11C, 11D, 11E:
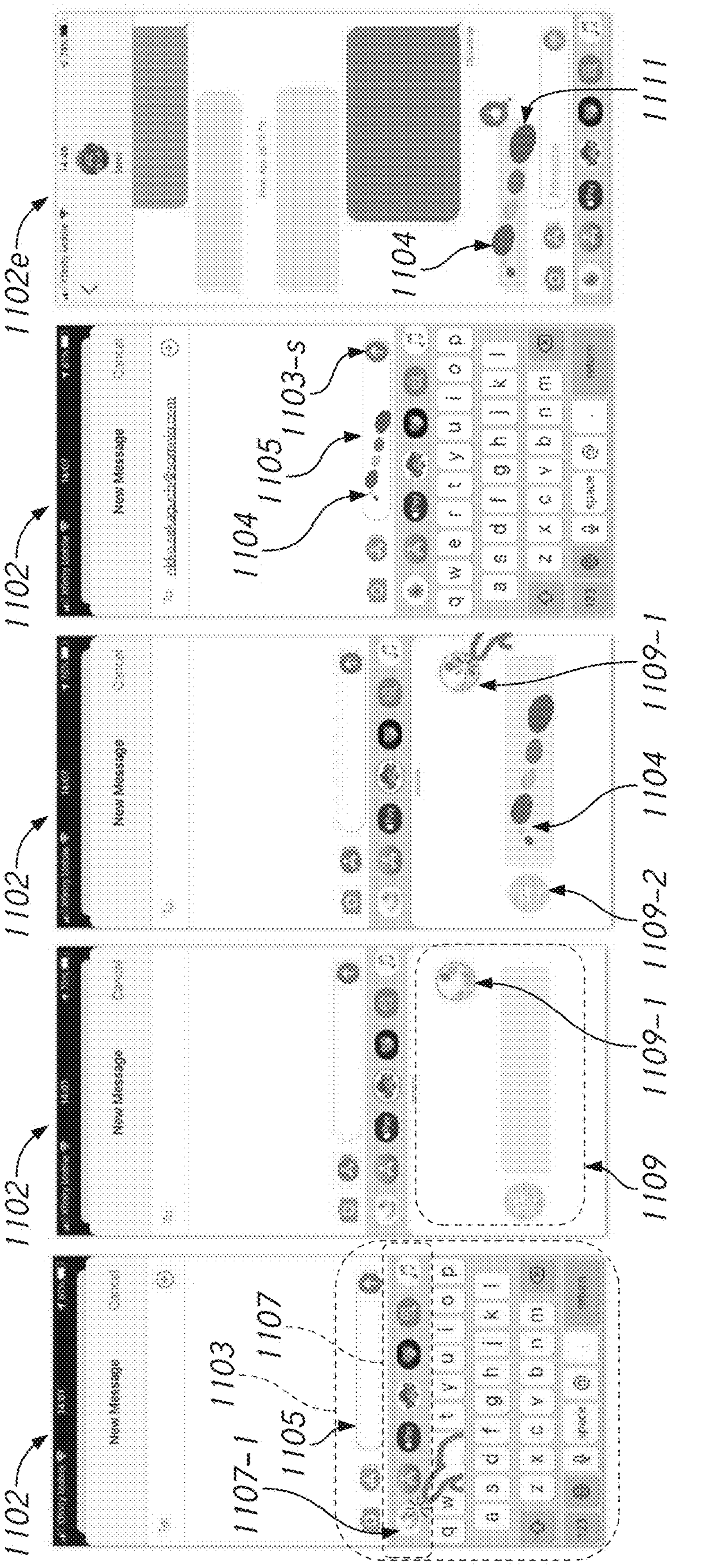
FIGS. 11A to 11E are schematic diagrams of an apparatus that provides a language learning system including a generated visual representation of speech on its touch screen in accordance with an embodiment of the present disclosure.

In FIG. 11A, the apparatus (e.g., smartphone) is configured to display a message interface screen 1102, e.g., when the enhanced text messaging app is being executed on the apparatus. The message interface screen 1102 may include standard Graphical User Interface (GUI) control elements (also referred to as soft controls), such as one or more soft controls 1103 allowing the user to create text messages (e.g., a keyboard, or a recording button to record a voice message which is then converted by the apparatus to text). The message interface screen 1102 may display a message window 1105 which displays a message draft before sending the message to a recipient. The message interface screen 1102 may include soft controls 1103 representing a keyboard including keys for typing a message, and may additionally, optionally include one or more soft controls (e.g., icons 1107) for accessing other applications (apps) or data associated therewith. In some examples, the message interface screen may display one or more icons 1107 configured to enable the user to append various user-generated content, such as images, videos, music, personal biometric data, etc., and/or activate the app, or features thereof, associated with a particular icon. In the enhanced text messaging app, the message interface screen 1102 may additionally include an icon 1107-1 of a speech visualization app (SVA) that can parse and generate a visual representation of speech in accordance with the examples herein. Upon selection (e.g., tapping) of the speech visualization app icon 1107-1, as shown in FIG. 11A, the speech visualization app is activated, providing its own SVA interface window 1109 within the text messaging app as shown in FIG. 11B, to allow the user to generate speech visualization(s) 1104 according to the present examples. As part of the SVA interface window 1109, the apparatus (e.g., smartphone) may display an icon 1109-1 that enables the user to record their own speech on the apparatus (e.g., smartphone) and/or generate a visualization of speech recorded previously or of a text message otherwise generated by or received by the user. In the present example, as shown in FIG. 11C, once the user taps the icon 1109-1 on the touch screen, the apparatus may enter a recording mode, activating a recording function using the apparatus' microphone to record the user's speech. For example, referring to the apparatus 10, the processor 11 may activate the audio input 14 so that either an internal microphone or an external microphone coupled to the audio input 14 detects sound waves generated by the user's speech, and records and provides the detected sound waves as a speech input (i.e. a speech waveform or speech signal) to the processor 11. The recording of the detected speech may be temporarily or permanently stored in memory communicatively coupled to the apparatus 10, such as the local memory 12 of the apparatus in FIG. 1. In some embodiments, the user may record their speech outside of the SVA, such as via the text messaging app's function for recording and converting speech. In such instances, when the SVA is activated, the user may tap another icon to retrieve the previously recorded speech and generate a visualization 1104, via the SVA, of the previously recorded speech. The apparatus (e.g., smartphone) may execute one or more processes for generating a visual expression of the speech, such as by creating objects for segments of the speech as previously described in accordance with any of the examples herein. As shown in FIG. 11C, the apparatus displays a graphical representation of the objects on the touch screen together with a message confirmation icon inviting a user to confirm the graphical representation of the objects as a message draft. Thus, when the user is satisfied with the visualization displayed in the SVA interface window 1109, the user may tap an icon (e.g., icon 1109-2) to transfer the user-generated content (e.g., the visualization 1104) to the text messaging app (e.g., to the message window 1105, as shown in FIG. 11D), whereby the message, here in the form of a visualization 1104, can be sent via soft controls (e.g., send icon 1103-*s*) of the text messaging app, to a recipient as shown in the interface screen 1102*e* of FIG. 11E. The transmission to a recipient may be executed a wireless transmission network, e.g., via the wireless transmitter/receiver 17 of the apparatus 10 in FIG. 1. As shown further in the interface screen 1102*e* of FIG. 11E, the recipient may interact (e.g., like, reply to, etc.) with the received message 1111, herein the form of a visualization 1104, as it would with a conventional text message received in the form of text.

FIGS. 12A to 12D are screen captures of an apparatus 1200 that provides a communication system including a generated visual representation of speech on its touch screen in accordance with an embodiment of the present disclosure. In some embodiments, user interfaces as shown in the screen captures in FIGS. 12A-12D may be generated by and provide on a display of a portable computing device (e.g., a smartphone). Thus, in some examples, an apparatus 1200 according to the present disclosure may be a smartphone which implements the apparatus 10 of FIG. 1, and has a touch screen that implements the display screen 13 of the apparatus in FIG. 1. The apparatus 1200 (e.g., smartphone) may be configured to execute a program (e.g., a messaging app) that provides a visual and/or text messaging service to a user. In accordance with the present disclosure, the messaging app may be configured to enable users to share (e.g., send and receive) speech visualizations generated (e.g., by a SVE) according to any of the examples herein and/or content that incorporates or is based, at least in part, on a speech visualization. In some embodiments, the messaging app interacts with a SVE (or components thereof), which resides in the cloud or is stored locally (e.g., in the memory 12 of the apparatus 10) to obtain speech visualization and generate the associated content that incorporates, or is based in part, on the speech visualization. In some embodiments, the visualization may be performed on speech that is recorded in real-time (e.g., as the user is using the messaging app) and may, optionally be displayed to the user and/or transmitted to a receiving user, together with its associated content (e.g., icon 1207A, 1208B, or 1208D).

Figure 12B:
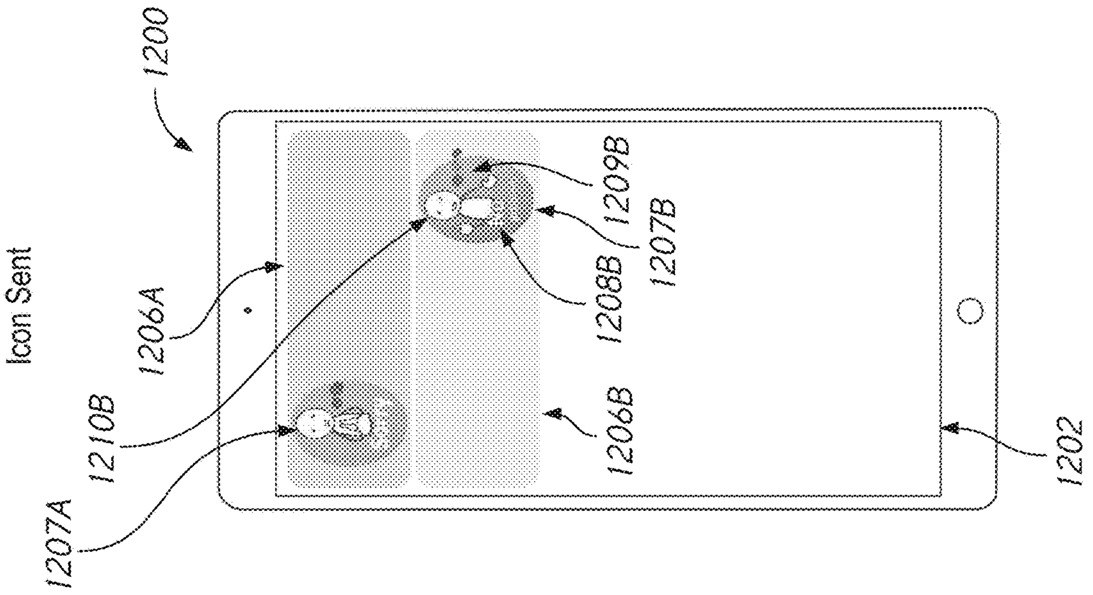
FIGS. 12A to 12D are schematic diagrams of an apparatus that provides a communication system including a generated visual representation of speech on its touch screen in accordance with an embodiment of the present disclosure.
Figure 12A:
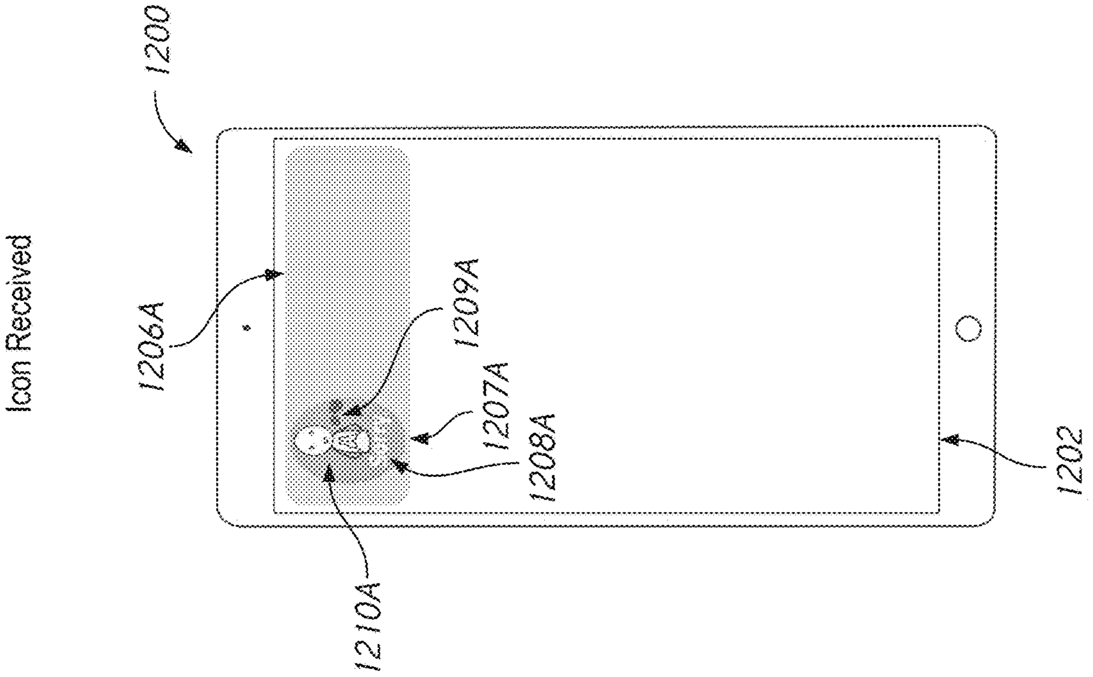

In FIGS. 12A-12D, the apparatus (e.g., smartphone) 1200 is configured to display a message interface screen 1202, e.g., when the messaging app is being executed on the apparatus 1200. FIGS. 12A-12D show examples of different graphical user interface elements of the messaging interface screen 1202 as the user is interacting with the messaging app to send and receive content. In FIG. 12A, the message interface screen 1202 displays a message window 1206A including an icon 1207A received from a sender. The icon 1207A may include one or a plurality of different types of content elements, such as a text element, a graphic element, a speech visualization element, or any combination thereof. The icon 1207A in FIG. 12A includes a text message 1208A, in this example, the text string “Sorry”, and a speech visualization 1209A corresponding to the sender's speech, e.g., as may be recorded by the sender uttering the word “Sorry” to his own device before generating the content (icon 1207A) and sending it to the receiving user. The icon 1207A of this example further includes a graphic 1210A selected by the sender's device based on the spoken message recorded and visualized. The messaging app may be in communication with memory (e.g., local memory 12 or a memory device on the cloud) storing a multitude of graphics, each associated (e.g., via a lookup table) with different messages, for example common messages such as “Sorry”, “No problem”, “No worries”, “Got it”, “Thanks”, “Talk soon”, etc. In some examples, the same or similar icon (e.g., a graphic including a thumbs up) may be associated with a plurality of different text strings (e.g., “Got it” or “No problem”) and may thus be selected and incorporated into content associated with any of those multiple different text messages. The graphic (e.g., 1208A) of content (e.g., icon 1207A) may visually convey information (e.g., an emotion) typically associated with the particular text message (e.g., 1208A) and thus communicating, through the messaging up, via the content rather than by text messages alone, may enrich the user's experience. In some example, the icon 1207A may additionally convey information about the user's pronunciation of the text message 1208A (e.g., the pitch, the speed at which the message was spoken, etc.), which may convey additional information to the sender about the content creator's state of mind (e.g., their emotion). In this manner, the messaging service may be enhanced, e.g., by communicating information about the users' speech that is not otherwise captured or available on traditional messaging apps.

As the user interacts with the messaging app, the message interface screen 1202 is updated to display additional GUI elements created through the interaction with the app. For example, as shown in FIG. 12B, a second message window 1206B is displayed in the message interface screen 1202 which includes an icon 1207B. The icon 1207B in this example represents content generated by the user of the apparatus 1200. In some examples, the message interface screen 1202 may include various user controls (e.g., any one or more of the icons 1107 of FIG. 11A) to enable the user to interact with other applications, such as append various other user-generated content, and/or activate other apps, or features thereof, residing on or communicatively coupled to the user's apparatus 1200. For example, and referring now also to FIG. 12C, one of the icons 1107 may enable the user to activate a voice recording function of the apparatus 1200.

Figure 12D:
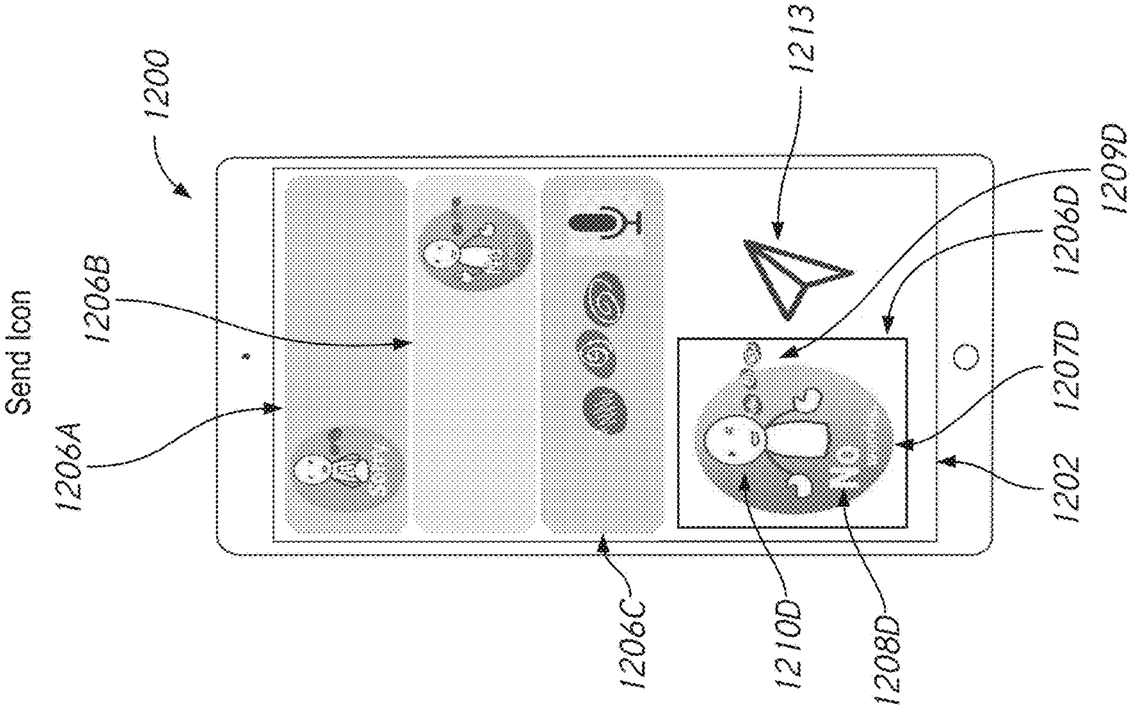
Figure 12C:
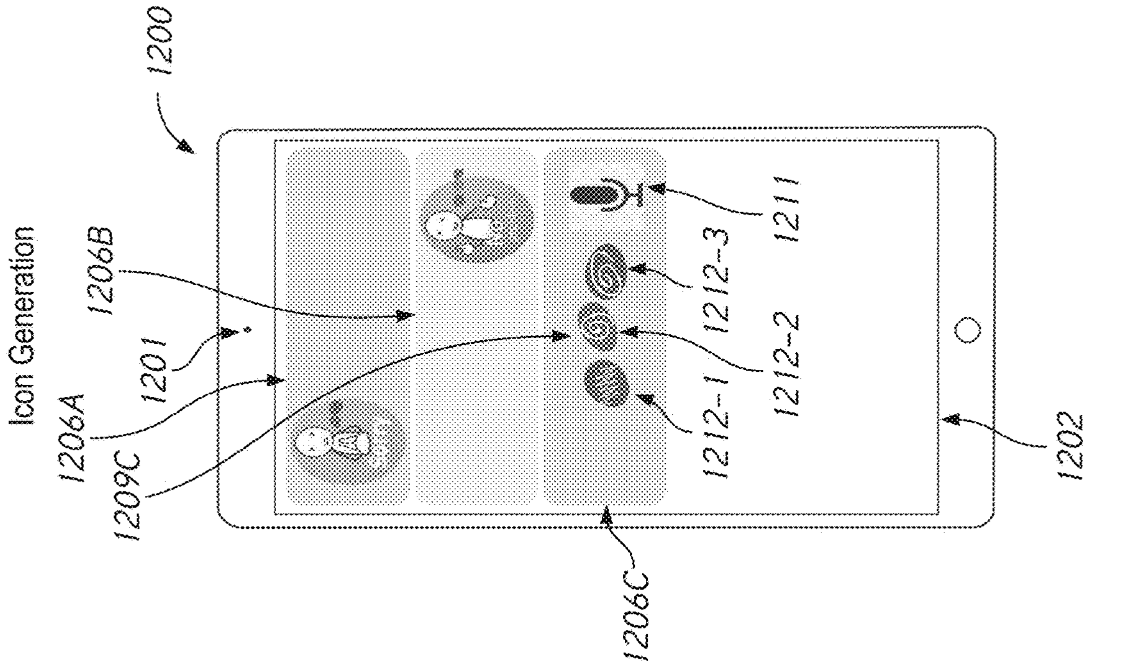

As shown further in FIG. 12C, the message interface screen 1202 may display, e.g., responsive to activation of the voice recording function, an icon enabling the user to visualize their recorded speech, which may optionally be displayed in another message window 1206C (e.g., created automatically upon activation of voice recording function). In the messaging app, an icon 1211, which may be displayed within the message window 1206C or at a different suitable location of the message interface screen 1202, may be displayed, which when selected by the user is configured to generate a visual representations 1209C of the recorded speech in accordance with the examples herein (e.g., using a speech visualization engine (SVE)). In some embodiments, the activation of the recording function within the messaging app, may also automatically activate the speech visualization function, e.g., responsive to a selection of a single icon, such as icon 1211. In yet other examples, an icon may be selected (e.g., icon 1107-1) to activate the speech visualization functions within the messaging app, which may then enable the user to record and generate visualizations of their recorded speech. Regardless of the mechanism by which recording mode is activated, the apparatus 1200 may enter a recording mode (e.g., responsive to the user tapping icon 1211), thus activating a recording function using a microphone 1201 of the apparatus 1200 to record the user's speech. For example, referring to the apparatus 10, the processor 11 may activate the audio input 14 so that either an internal microphone or an external microphone coupled to the audio input 14 detects sound waves generated by the user's speech, and records and provides the detected sound waves as a speech input (i.e. a speech waveform or speech signal) to the processor 11. The recording of the detected speech may be temporarily or permanently stored in memory communicatively coupled to the apparatus 10, such as the local memory 12 of the apparatus in FIG. 1. In some embodiments, the user may record their speech outside of the messaging app, such as via other standard voice recording functions of the apparatus 1200. In such instances, when the icon 1211 is selected by the user, the messaging app may present the user with a GUI for selecting or retrieve the previously recorded speech, whereupon the messaging app subsequently generates the visualization 1209C of the previously recorded speech. In the screen capture in FIG. 11C, the messaging app has generated the visualization 1209C (e.g., a plurality of objects 1212-1 to 1212-3, which may be color coded and arranged to communicate various properties of the speech such as amplitude, pitch, etc.) in accordance with the examples herein. In some embodiments, the visualization 1209C of the speech may be displayed (e.g., temporarily before creation of a corresponding icon) within the messaging interface 1202.

Following visualization of the speech, the messaging app may generate content (e.g., icon 1207D) associated with the visualized speech, e.g., as shown in FIG. 12D. The content (e.g., icon 1207D) may be displayed in the message interface screen 1202, for example in yet another message window 1206D, or within the same window 1206C with visualized speech, if the visualized speech was displayed. In some embodiments, the message window 1206D may be a confirmation window that displays the user-generated content (e.g., icon 1207D) before the content is transmitted to another user. Similar to other icons (e.g., icon 1207A and 1207B), the icon 1207D may include a text message 1208D, a graphic 1210D, and/or a visualization 1209D of the user's speech. In this example, the icon 1207D incorporates (or includes) the visualization 1209D within the user-created content to be shared. The visualization 1209D may be suitably arranged in relation to the graphic 1210D, which may be an illustration of a person, such as in proximity to a mouth of the person illustrated in the graphic. Once the user is satisfied with the user-generated content, the user may tap an icon 1213 configured for transmission of a message to another user, and the apparatus 1200 may, responsively, transmit the user-generated content (e.g., the icon 1207D) to the intended recipient, and may then display, in a message window of the messaging app, a copy of the content-enhanced message transmitted to the recipient. In the example of FIG. 12D, the user-generated content may be a reply to the message from the sender, thus, the user-generated content may be provided to the sender of the message 1207A. If the user is not satisfied with the user-generated content (e.g., icon 1207D), the user may re-record the speech, which may create a different visualization string and thus an icon 1207D containing a different visualization 1209D.

The present invention is not limited to the specific embodiments and examples described above. It is contemplated that the invention may be embodied in different combinations other than the specific combination described. It is also contemplated that various combination or sub-combination of the specific features and aspects of the embodiments may be made and still fall within the scope of the inventions. It should be understood that various features and aspects of the disclosed embodiments can be combined with or substituted for one another in order to form varying mode of the disclosed invention. Thus, it is intended that the scope of at least some of the present invention herein disclosed should not be limited by the particular disclosed embodiments described above.

What is claimed is:

1. A method of computer-generated visualization of speech including at least one segment, the method comprising:
- generating a graphical representation of an object corresponding to a segment of the speech based on a pronunciation of the segment of the speech, wherein generating the graphical representation comprises:
  - representing a duration of the segment by a length of the object;
  - representing intensity of the segment by a width of the object; and
  - representing a pitch contour of the segment by an angle of inclination of the object with respect to a reference frame;
- displaying the graphical representation of the object on a screen of a computing device;
- generating a first visualization of a first set of objects of a plurality of segments of a first speech spoken by a user; and
- generating and displaying on the screen a second visualization of a second set of objects of the plurality of segments of a second speech spoken by the user, wherein the first set of objects or the second set of objects includes the object, wherein the first speech and the second speech are recorded at different times, and wherein the second visualization represents at least one discrepancy in the user vocalizing a same phrase spoken in the first speech and the second speech.

2. The method of claim 1, wherein the first visualization and the second visualization are representative of a first speech pattern.

3. The method of claim 1, wherein the first visualization is representative of a first speech pattern and the second visualization is representative of a second speech pattern.

4. The method of claim 1, wherein the pitch contour is associated with movement of fundamental frequencies, and
- wherein generating the graphical representation further comprises representing an offset of the fundamental frequencies of the segment by a vertical position of the object with respect to the reference frame.

5. The method of claim 1, further comprising displaying the object in a color selected based on a location and/or a manner of articulation of a sound that corresponds to the segment.

6. The method of claim 1, wherein the segment includes at least one phoneme.

7. The method of claim 6, further comprising displaying the object in a color selected based on a first phoneme in the segment.

8. The method of claim 1, wherein the second visualization is displayed on the screen such that a first end of the first set of objects and a first end of the second set of objects are substantially vertically aligned on the screen.

9. The method of claim 1, wherein the object has a shape selected from a rectangle, an ellipse, and an oval.

10. The method of claim 1, wherein an angle of inclination of the object changes along the length of the object.

11. The method of claim 1, further comprising generating a spectrogram of the segment of the speech, and wherein displaying the graphical representation of the object comprises overlaying the graphical representation on the spectrogram.

12. The method of claim 1, further comprising:

comparing the first speech and the second speech to identify the at least one discrepancy between the first speech and the second speech in the second visualization.

13. The method of claim 1, further comprising:

editing the second visualization of the second speech based on the first visualization of the first speech.

14. The method of claim 13, wherein editing the second visualization comprises removing a second portion of second set of objects representative of the second speech which does not correspond to the first set of objects representative of the first speech.

15. The method of claim 1, further comprising:

displaying on the screen the first visualization.

16. A system comprising:

a processor;

a display; and a memory comprising instructions that, when executed by the processor, cause the processor to perform operations including:

generating a graphical representation of an object corresponding to a segment of the speech, wherein the graphical representation is generated by:

representing a duration of the segment by a length of the object;

representing intensity of the segment by a width of the object; and representing a pitch contour of the segment by an angle of inclination of the object with respect to a reference frame;

displaying the graphical representation of the object on a screen of a computing device;

generating a first visualization of a first set of objects of a plurality of segments of a first speech spoken by a speaker; and generating and displaying on the screen a second visualization of a second set of objects of the plurality of segments of a second speech spoken by the speaker, wherein the first set of objects or the second set of objects includes the object, wherein the first speech and the second speech are recorded at different times, and wherein the second visualization represents at least one discrepancy in the speaker vocalizing a same phrase spoken in the first speech and the second speech.

17. The system of claim 16, wherein the first speech and the second speech are representative of a first speech pattern.

18. The system of claim 16, wherein the first visualization is representative of a first speech pattern and the second visualization is representative of a second speech pattern.

19. The system of claim 16, wherein the operations further comprise displaying the object in a color selected based on a location and/or a manner of articulation of a sound that corresponds to the segment.

20. The system of claim 16, wherein the second visualization is displayed on the screen such that a first end of the first set of objects and a first end of the second set of objects are substantially vertically aligned on the screen.

21. The system of claim 16, wherein the operations further comprise:

comparing the first speech and the second speech to identify at least one discrepancy between the first speech and the second speech in the second visualization.

22. The system of claim 16, wherein the processor is further configured to display on the screen the first visualization.

* * * * *